United States Patent
Muneshima et al.

(10) Patent No.: US 8,527,106 B2
(45) Date of Patent: Sep. 3, 2013

(54) SYSTEM STABILIZATION DEVICE

(75) Inventors: Masakazu Muneshima, Tokyo (JP); Kazunobu Oi, Tokyo (JP); Issei Hirayama, Tokyo (JP)

(73) Assignee: Meidensha Corporation, Tokyo (JP)

( * ) Notice: Subject to any disclaimer, the term of this patent is extended or adjusted under 35 U.S.C. 154(b) by 275 days.

(21) Appl. No.: 12/934,623

(22) PCT Filed: Apr. 10, 2009

(86) PCT No.: PCT/JP2009/057340
§ 371 (c)(1),
(2), (4) Date: Dec. 22, 2010

(87) PCT Pub. No.: WO2009/125834
PCT Pub. Date: Oct. 15, 2009

(65) Prior Publication Data
US 2011/0098866 A1    Apr. 28, 2011

(30) Foreign Application Priority Data
Apr. 11, 2008 (JP) .................. 2008-103037

(51) Int. Cl.
*H02J 1/10* (2006.01)
*H02J 1/00* (2006.01)
*H02J 3/00* (2006.01)
*H02J 1/04* (2006.01)
*G05B 13/02* (2006.01)

(52) U.S. Cl.
USPC .......... 700/293; 307/52; 307/53; 307/54; 307/55; 307/56; 307/57; 307/58; 307/59; 307/60; 307/61; 307/62; 700/28; 700/29; 700/30; 700/31; 700/32; 700/33; 700/34; 700/35; 700/36; 700/37

(58) Field of Classification Search
USPC .................. 700/293; 416/132 B; 307/52–62
See application file for complete search history.

(56) References Cited

U.S. PATENT DOCUMENTS 4,335,437 A * 6/1982 Wilson et al. ............... 700/293
4,855,922 A * 8/1989 Huddleston et al. .......... 700/295
(Continued)

FOREIGN PATENT DOCUMENTS
JP  9-121599   5/1997
JP  10-14251   1/1998
(Continued)

OTHER PUBLICATIONS

Mienski et al., "Voltage Dip Compensation in LV Networks Using Distributed Energy Resources", IEEE, 2004, 5 pg.*

(Continued)

*Primary Examiner* — Kavita Padmanabhan
*Assistant Examiner* — Thomas Stevens
(74) *Attorney, Agent, or Firm* — Foley & Lardner LLP

(57) ABSTRACT

A control unit of a system stabilization device uses a fluctuation detection block (60) to determine fluctuation components included in the active component and reactive component currents of a system current and fluctuation components included in the frequency signal and the amplitude signal of a system voltage. The high frequency cut-off of the fluctuation detection block (60) is set to be f1; the low frequency cut-off is set to be f2. The fluctuation detection block (60) is composed of a low-pass filter (61) with a time constant of T1, a low-pass filter (62) with a time constant of T2, a subtracter (63) which outputs the difference, between the output signals of the filter (61) and the filter (62), and a feedback circuit (64) which provides feedback on the output of the subtracter (63) to the filters (61, 62). Thus, stability is ensured without using a current detector.

8 Claims, 9 Drawing Sheets

(56) References Cited

U.S. PATENT DOCUMENTS

| | | | |
|---|---|---|---|
| 4,882,778 A * | 11/1989 | Hosaka et al. | 700/82 |
| 5,835,321 A * | 11/1998 | Elms et al. | 361/45 |
| 6,745,095 B1 * | 6/2004 | Ben-Dov et al. | 700/121 |
| 7,239,044 B1 * | 7/2007 | Atcitty et al. | 307/66 |
| 7,373,221 B2 * | 5/2008 | Lal | 700/291 |
| 2002/0036430 A1 * | 3/2002 | Welches et al. | 307/18 |
| 2003/0011348 A1 * | 1/2003 | Lof et al. | 322/37 |
| 2004/0051387 A1 * | 3/2004 | Lasseter et al. | 307/80 |
| 2004/0183307 A1 * | 9/2004 | Yoshida et al. | 290/44 |
| 2005/0122083 A1 * | 6/2005 | Erdman et al. | 322/20 |
| 2006/0249957 A1 * | 11/2006 | Ito et al. | 290/44 |
| 2007/0110578 A1 * | 5/2007 | Stommel | 416/132 B |
| 2007/0120369 A1 * | 5/2007 | Delmerico et al. | 290/44 |
| 2010/0201195 A1 * | 8/2010 | Maegawa | 307/66 |

FOREIGN PATENT DOCUMENTS

| | | | |
|---|---|---|---|
| JP | 2001-286062 | | 10/2001 |
| JP | 2007306669 A | * | 11/2007 |
| JP | 2008-43151 | | 2/2008 |

OTHER PUBLICATIONS

Asano et al., "Load Fluctuation Analysis of Commercial and Residential Customers for Operation Planning of a Hybrid Photovoltaic and Congeneratrion System" IEEE, 2006.*

International Search Report received in corresponding PCT application No. PCT/JP2009/057340, 37 pages.

* cited by examiner

SYSTEM STABILIZATION DEVICE

TECHNICAL FIELD

This invention relates to a system stabilization device, which is designed to stabilize control actions while cutting down on measuring instruments.

BACKGROUND ART

In recent years, power generation by natural energy such as sunlight or wind power has found use.

FIG. 7 shows an example in which an existing power system (superior distribution system) 1 and a distribution system (micro grid) 10 are connected via a line impedance Ls and a circuit breaker 2.

A dispersed generation plant 11 and a load 12 are connected to the distribution system 10 which is the micro grid. The dispersed generation plant 11 is illustrated as a single generator in FIG. 7. Actually, however, it is composed of a plurality of dispersed facilities for power generation, which include natural energy type power generation equipment utilizing natural energy (e.g., photovoltaic power generation equipment or wind power generation equipment), and internal combustion engine type power generation equipment driven by an internal combustion engine (e.g., diesel power generation equipment). Also, the load 12 is actually a plurality of dispersed loads.

With the micro grid 10 as shown in FIG. 7, the amount of power generation varies or fluctuates greatly according to weather conditions, wind speed, etc., because it has natural energy type power generation equipment.

In order to absorb or accommodate such fluctuations in the amount of power generation, therefore, a system stabilization device is used.

With the internal combustion engine type power generation equipment, output power is adjusted by governor control. However, governor control is slow in response. Thus, if electric power consumed by the load 12 suddenly changes, the internal combustion engine type power generation equipment cannot follow such a sudden change (sudden excess or deficiency) in electric power.

The system stabilization device is also used for the purpose of following such a sudden change in electric power with good response, thereby assisting the internal combustion engine type power generation equipment to balance demand for and supply of electric power.

The system stabilization device is a power converter having a power storage function, and it is also a device installed in the distribution system to make the aforementioned power compensation.

FIG. 8 shows an example in which a system stabilization device 20 is provided in the distribution system (micro grid) 10 shown in FIG. 7. The system stabilization device 20 is connected in parallel with the dispersed generation plant 11 and the load 12.

The system stabilization device 20 has a control unit 21, a power converter 22 (inverter) capable of an inverting action and a converting or rectifying action, and a direct current charging unit 23, such as an electric double layer capacitor, as main units.

The power converter 22 acts responsive to a gate signal g fed from the control unit 21. This power converter 22, when performing a converting action, converts an alternating current (AC) power obtained from the distribution system 10 into a direct current (DC) power, and charges this DC power into the direct current charging unit 23. When performing an inverting action, the power converter 22 converts the DC power charged in the direct current charging unit 23 into an AC power, and sends this AC power to the distribution system 10.

The power outputted from the power converter (inverter) 22 is passed through a filter circuit 27, and sent out to the distribution system 10. That is, the power sent from the system stabilization device 20 out to the distribution system 10 is the power outputted from the power converter 22 and then filtered by the filter circuit 27.

The filter circuit 27 is composed of a reactor, a capacitor and a transformer, and functions to smooth a pulse voltage outputted from the power converter 22.

In the system stabilization device 20, a system current Is, which flows from the power system 1 into the distribution system 10, is detected by a current detector 24, a system voltage Vs which is the voltage of the distribution system 10 is detected by a voltage detector 25, and an AC output current $I_{inv}$ outputted from the power converter 22 is detected by a current detector 26. Moreover, a current detector AA for detecting a current fed out of the system stabilization device 20 to the distribution system 10 is provided for reasons to be described later.

Under normal conditions where no breakdown or the like occurs in the power system 1, the circuit breaker 2 is in a connected state, so that "a system-interconnected run", an operation with the distribution system 10 being tied to the power system 1, is performed in the system stabilization device 20. During the system-interconnected run, electric power is supplied to the load 12 by the power system 1, the dispersed generation plant 11, and the system stabilization device 20.

Under abnormal conditions where a breakdown occurs in the power system 1, on the other hand, the circuit breaker 2 is in a cut-off state, and the system stabilization device 20 makes a "self-supporting or isolated run", an operation performed with the distribution system 10 being cut off from the power system 1. During the self-supporting run, electric power is supplied to the load 12 by the dispersed generation plant 11 and the system stabilization device 20.

The system stabilization device 20 performs the following actions during the system-interconnected run and the self-supporting run:

(1) During the system-interconnected run, the system stabilization device 20 acts to detect the system current Is flowing into the distribution system 10, determine a system power from the system current Is, and suppress fluctuations in this system power.

(2) During the self-supporting run, the system stabilization device 20 detects the system voltage Vs within the distribution system 10, and performs a compensating action so that the voltage amplitude and frequency of this system voltage Vs become stable.

Details of the control unit 21 of the system stabilization device 20 will be described by reference to FIG. 9.

A phase-locked loop (PLL) 101 outputs a reference phase signal θ showing the phase of the system voltage Vs based on the system voltage Vs. A sine wave generator 102 outputs a three-phase voltage waveform {sin(θ), sin(θ−⅔π), sin(θ+⅔π)}, corresponding to a rated voltage synchronized to the reference phase signal θ, as a reference three-phase sine wave signal K.

A change-over switch 103, during the system-interconnected run, has movable contacts 103a, 103b thrown to the A side as indicated by solid lines in the drawing and, during the self-supporting run, has the movable contacts 103a, 103b thrown to the B side as indicated by dashed lines in the drawing.

Next, explanations will be offered for the respective functional blocks working during the system-interconnected run, and for their control actions during the system-interconnected run.

A dq transformation unit 104 dq-transforms the system current Is to a rotating coordinate system rotating in a phase indicated by the reference phase signal θ to output the active component $Is_d$ of the system current and the reactive component $Is_q$ of the system current.

A first fluctuation detection block 105 detects the fluctuation component of the active component $Is_d$ of the system current on the dq-axes, and outputs it as a current command $I_{refd}$ for the active component. A second fluctuation detection block 106 detects the fluctuation component of the reactive component $Is_q$ of the system current on the dq-axes, and outputs it as a current command $I_{refq}$ for the reactive component.

The fluctuation detection blocks 105, 106 are band-pass filters having a differentiation function and a filter function, and details of their structures will be described later.

A dq transformation unit 107 dq-transforms the AC output current $I_{inv}$ to a rotating coordinate system rotating in a phase indicated by the reference phase signal θ to output the active component $I_{invd}$ of the AC output current and the reactive component $I_{invq}$ of the AC output current.

A subtraction unit 108 subtracts the active component $I_{invd}$ of the AC output current from the current command $I_{refd}$ for the active component to output a current deviation Δd for the active component. A subtraction unit 109 subtracts the reactive component $I_{invq}$ of the AC output current from the current command $I_{refq}$ for the reactive component to output a current deviation Δq for the reactive component.

A current control unit 110 exercises the proportional plus integral (PI) control of the current deviation Δd for the active component to output a voltage command Vd for the active component. A current control unit 111 exercises the proportional plus integral (PI) control of the current deviation Δq for the reactive component to output a voltage command Vq for the reactive component.

A dq inverse transformer unit 112 applies dq inverse transformation to the voltage command Vd for the active component and the voltage command Vq for the reactive component to output a voltage command V φ of a fixed coordinate system.

An addition unit 113 adds the reference three-phase sine wave signal K to the voltage command V φ to output a final voltage command V*.

A PWM (pulse width modulation) modulator 114 PWM-modulates the voltage command V* to output the gate signal g.

In accordance with this gate signal g, action control over the power converter 22 is effected. To suppress fluctuations in the system current Is during the system-interconnected run, power is outputted from the power converter 22.

Next, explanations will be offered for the respective functional blocks working during the self-supporting run, and for their control actions during the self-supporting run.

A frequency detection unit 121 detects the frequency of the system voltage Vs to output a frequency signal F. The frequency of the system voltage Vs corresponds to the active power, and is in a corresponding relationship with the active power such that when the active power decreases, the frequency of the system voltage Vs decreases, and when the active power increases, the frequency of the system voltage Vs increases.

An amplitude detection unit 122 detects the amplitude of the system voltage Vs to output an amplitude signal L. The amplitude of the system voltage Vs corresponds to the reactive power, and is in a corresponding relationship with the reactive power such that when the reactive power decreases, the amplitude of the system voltage Vs decreases, and when the reactive power increases, the amplitude of the system voltage Vs increases.

A third fluctuation detection block 123 detects the fluctuation component of the frequency signal F, and outputs it as a current command $I_{refd}$ for the active component. A fourth fluctuation detection block 124 detects the fluctuation component of the amplitude signal L, and outputs it as a current command $I_{refq}$ for the reactive component.

The fluctuation detection blocks 123, 124 are band-pass filters having a differentiation function and a filter function, and details of their structures will be described later.

The subtraction unit 108 subtracts the active component $I_{refd}$ of the AC output current from the current command $I_{refd}$ for the active component to output a current deviation Δd for the active component. The subtraction unit 109 subtracts the reactive component $I_{invq}$ of the AC output current from the current command $I_{refq}$ for the reactive component to output a current deviation Δq for the reactive component.

The current control unit 110 exercises the proportional plus integral (PI) control of the current deviation Δd for the active component to output a voltage command Vd for the active component. The current control unit 111 exercises the proportional plus integral (PI) control of the current deviation Δq for the reactive component to output a voltage command Vq for the reactive component.

The dq inverse transformer unit 112 applies dq inverse transformation to the voltage command Vd for the active component and the voltage command Vq for the reactive component to output a voltage command V φ of a fixed coordinate system.

The addition unit 113 adds the reference three-phase sine wave signal K to the voltage command V φ to output a final voltage command V*.

The PWM (pulse width modulation) modulator 114 PWM-modulates the voltage command V* to output the gate signal g.

In accordance with this gate signal g, action control over the power converter 22 is effected. To suppress fluctuations in the voltage amplitude and frequency of the system voltage Vs during the self-supporting run, power is outputted from the power converter 22.

The fluctuation detection blocks 105, 106, 123, 124 are composed of the band-pass filters, as stated above.

The configuration of a conventional band-pass filter 50, which can be used as the fluctuation detection blocks 105, 106, 123, 124, will be described by reference to FIG. 10. In FIG. 10, the symbol s denotes a Laplace operator showing a differentiation function.

As shown in FIG. 10, this band-pass filter (fluctuation detection block) 50 is composed of a low-pass filter 51, a low-pass filter 52, and a subtracter 53.

The pass band frequency of the band-pass filter 50 is determined in accordance with filtering characteristics required of the respective fluctuation detection blocks 105, 106, 123, 124. The cut-off frequency on the high frequency side of the determined pass band frequency is set to be f1, and the cut-off frequency on the low frequency side of the determined pass band frequency is set to be f2.

Thus, the low-pass filter 51 for noise removal has a cut-off frequency set at f1, and has a time constant set at T1. The low-pass filter 52 for setting the fluctuation detection time has a cut-off frequency set at f2, and has a time constant set at T2. Here, f1=1/T1, and f2=1/T2.

The low-pass filter 51 is a filter having first order lag characteristics, and its time constant is set to be the time constant T1 determined for the purpose of noise removal.

The low-pass filter 52 is a filter having first order lag characteristics, and its time constant is set to be the time constant T2 determined for the purpose of setting the time for detecting fluctuations.

Upon entry of an input signal, both filters 51 and 52 utilize their filtering characteristics to filter the input signal.

If the band-pass filter (fluctuation detection block) 50 is the fluctuation detection block 105, its input signal is the active component $Is_d$ of the system current.

If the band-pass filter (fluctuation detection block) 50 is the fluctuation detection block 106, its input signal is the reactive component $Is_q$ of the system current.

If the band-pass filter (fluctuation detection block) 50 is the fluctuation detection block 123, its input signal is the frequency signal F.

If the band-pass filter (fluctuation detection block) 50 is the fluctuation detection block 124, its input signal is the amplitude signal L.

The subtracter 53 outputs a signal obtained by subtracting a signal outputted from the low-pass filter 52 from a signal outputted from the low-pass filter 51. The signal outputted from the subtracter 53 is a fluctuation component signal.

If the band-pass filter (fluctuation detection block) 50 is the fluctuation detection block 105, its fluctuation component signal is the current command $I_{refd}$ for the active component which is the fluctuation component of the active component $Is_d$ of the system current.

If the band-pass filter (fluctuation detection block) 50 is the fluctuation detection block 106, its fluctuation component signal is the current command $I_{refq}$ for the reactive component which is the fluctuation component of the reactive component $Is_q$ of the system current.

If the band-pass filter (fluctuation detection block) 50 is the fluctuation detection block 123, its fluctuation component signal is the current command $I_{refd}$ for the active component which is the fluctuation component of the frequency signal F.

If the band-pass filter (fluctuation detection block) 50 is the fluctuation detection block 124, its fluctuation component signal is the current command $I_{ref}$ for the reactive component which is the fluctuation component of the amplitude signal L.

PRIOR ART DOCUMENT

Patent Document
Patent Document 1: JP-A-10-14251

SUMMARY OF THE INVENTION

Problems to be Solved by the Invention

The above-mentioned conventional technologies have been confronted with the following problems:

During the system-interconnected run, the system stabilization device 20 works to have the power converter 22 deliver power, thereby making power compensation, in order to suppress fluctuations in the system current Is. As a result, the detected value of the system current Is detected next time is decreased by an amount corresponding to the current outputted for power compensation from the power converter 22.

Such a decrease in the detected value of the system current Is makes it impossible to suppress fluctuations in the system current Is reliably.

To prevent this drawback, it is conceivable to detect the current fed out from the system stabilization device 20 to the distribution system 10, namely, the output current outputted from the power converter 22, filtered by the filter circuit 27, and then fed out to the distribution system 10, and add the detected value of this output current to the detected value of the system current, thereby canceling out the decrease in the detected value of the system current.

In this case, however, the problem arises that the current detector AA for detecting the current delivered from the system stabilization device 20 to the distribution system 10 (the current after passage through the filter circuit 27) is separately required.

To prevent the above drawback, another idea is to equip the output side of the fluctuation detection blocks 105, 106 with a proportional plus integral (PI) amplifier to amplify the current commands $I_{refd}$, $I_{refq}$, thereby canceling out the decrease in the detected value of the system current. This idea poses the problem of the separate need for the PI amplifier for amplifying the current commands $I_{refd}$, $I_{refq}$.

Furthermore, the PI amplifier is characterized in that a gain on the direct current component of the input signal becomes infinite. Even if the fluctuation component is zero, therefore, the output of the PI amplifier is not reduced to zero, so that the power continues to be outputted from the system stabilization device 20. To eliminate this shortcoming, the PI amplifier needs to be reset.

However, an abrupt reset results in a sudden change of the power outputted from the system stabilization device 20 to zero, thereby adversely affecting the system, etc. In this view, complicated control which involves returning the output of the PI amplifier to zero little by little, instead of such a simple reset, is needed. This is another problem.

During the self-supporting run, the system stabilization device 20 works to have the power converter 22 deliver power, thereby making power compensation, in order to suppress fluctuations in the frequency and amplitude of the system voltage Vs. As a result, the detected value of the frequency or the detected value of the amplitude of the system voltage Vs detected next time is decreased by an amount corresponding to the current outputted for power compensation from the power converter 22. Such a decrease in the detected value of the frequency or the detected value of the amplitude of the system voltage Vs makes it impossible to suppress fluctuations in the system voltage Vs reliably.

As described above, therefore, it is conceivable to detect the current fed out from the system stabilization device 20 to the distribution system 10, namely, the output current outputted from the power converter 22, filtered by the filter circuit 27, and then fed out to the distribution system 10, and add the detected value of this output current to the detected value of the frequency or the detected value of the amplitude of the system voltage; or to provide a PI amplifier. These measures, however, arouse the same problems as stated above.

The present invention has been accomplished in the light of the above-described conventional technologies. It is an object of the invention to provide a system stabilization device capable of performing stable actions, without using a current detector for detecting the output current of the system stabilization device, or using a PI amplifier.

Means for Solving the Problems

A constitution of the present invention for solving the above problems is a system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detection block, and uses the fluctuation component as a current command for the active component;

determines a fluctuation component included in the reactive component of the system current by a second fluctuation detection block, and uses the fluctuation component as a current command for the reactive component;

further determines an active component of an alternating current output current and a reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detection block, and uses the fluctuation component as a current command for an active component;

determines a fluctuation component included in the amplitude signal by a fourth fluctuation detection block, and uses the fluctuation component as a current command for a reactive component;

further determines the active component of the alternating current output current and the reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when a cut-off frequency on a high frequency side of a pass band frequency of the fluctuation detection block is set to be f1, a cut-off frequency on a low frequency side of the pass band frequency is set to be f2, a time constant of a low-pass filter for noise removal which has a cut-off frequency of f1 is set to be T1, and a time constant of a low-pass filter for setting a fluctuation detection time which has a cut-off frequency of f2 is set to be T2, the first to fourth fluctuation detection blocks are each composed of a first filter having first order lag characteristics with a time constant of T1, a second filter having first order lag characteristics with a time constant of T2, a subtracter which performs subtraction between a signal outputted from the first filter and a signal outputted from the second filter and outputs a resulting difference, and a feedback circuit for providing the first and second filters with feedback on an output of the subtracter.

Another constitution of the present invention is the above system stabilization device, wherein in each of the first to fourth fluctuation detection blocks, the cut-off frequency on the high frequency side of the pass band frequency of the fluctuation detection block is set as f1, the cut-off frequency on the low frequency side of the pass band frequency is set as f2, the time constant for noise removal with a value of 1/f1 is set as T1, and the time constant for setting the fluctuation detection time with a value of 1/f2 is set as T2, and the first to fourth fluctuation detection blocks each perform computations with use of computing programs to add an input signal inputted to the fluctuation detection block and a feedback signal, carry out first order lag filtering of a sum of the input signal and the feedback signal, with a time constant as T1, to determine a first filter signal, carry out first order lag filtering of a sum of the input signal and the feedback signal, with a time constant as T2, to determine a second filter signal, and subtract the second filter signal from the first filter signal to determine a fluctuation component, output the fluctuation component as the current commands, and feed back the fluctuation component as the feedback signal.

Another constitution of the present invention is a system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detection block, and uses the fluctuation component as a current command for the active component;

determines a fluctuation component included in the reactive component of the system current by a second fluctuation detection block, and uses the fluctuation component as a current command for the reactive component;

further determines an active component of an alternating current output current and a reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detection block, and uses the fluctuation component as a current command for an active component;

determines a fluctuation component included in the amplitude signal by a fourth fluctuation detection block, and uses the fluctuation component as a current command for a reactive component;

further determines the active component of the alternating current output current and the reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when a cut-off frequency on a high frequency side of a pass band frequency of the fluctuation detection block is set to be f1, a cut-off frequency on a low frequency side of the pass band frequency is set to be f2, a time constant of a low-pass filter for noise removal which has a cut-off frequency of f1 is set to be T1, a time constant of a low-pass filter for setting a fluctuation detection time which has a cut-off frequency of f2 is set to be T2, ζ is set as an oscillation coefficient, α is set as a setting number, G is set as a gain, a value obtained by multiplying T1 by α is set to be T3, and a value obtained by dividing T2 by α is set to be T4, the first to fourth fluctuation detection blocks are each composed of a first filter having first order lag characteristics with a time constant of T3, a second filter having first order lag characteristics with a time constant of T4, a subtracter which performs subtraction between a signal outputted from the first filter and a signal outputted from the second filter and outputs a resulting difference, and an amplifier for multiplying an output of the subtracter by the gain G, and outputting a resulting product, and ζ expressed by Formula (01) is set at a value of 1 or higher, and the setting number α and the gain G are set using the Formula (01), Formula (02) and Formula (03):

[1st mathematical formulas]

$$\zeta = \frac{T1 \cdot \alpha + \frac{T2}{\alpha}}{2\sqrt{T1T2}} \quad (01)$$

$$\alpha = \frac{2\sqrt{T1T2} \cdot \xi \pm \sqrt{4T1 \cdot T2 \cdot \xi^2 - 4T1 \cdot T2}}{2T1} \quad (02)$$

$$G = \frac{\alpha(T2 - T1)}{T2 - \alpha^2 T1} \quad (03)$$

Another constitution of the present invention is a system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detection block, and uses the fluctuation component as a current command for the active component;

determines a fluctuation component included in the reactive component of the system current by a second fluctuation detection block, and uses the fluctuation component as a current command for the reactive component;

further determines an active component of an alternating current output current and a reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detection block, and uses the fluctuation component as a current command for an active component;

determines a fluctuation component included in the amplitude signal by a fourth fluctuation detection block, and uses the fluctuation component as a current command for a reactive component;

further determines the active component of the alternating current output current and the reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when a cut-off frequency on a high frequency side of a pass band frequency of the fluctuation detection block is set to be f1, a cut-off frequency on a low frequency side of the pass band frequency is set to be f2, a time constant of a low-pass filter for noise removal which has a cut-off frequency of f1 is set to be T1, a time constant of a low-pass filter for setting a fluctuation detection time which has a cut-off frequency of f2 is set to be T2, ζ is set as an oscillation coefficient, α is set as a setting number, G is set as a gain, a value obtained by multiplying T1 by α is set to be T3, and a value obtained by dividing T2 by α is set to be T4, the first to fourth fluctuation detection blocks are each composed of a first filter having first order lag characteristics with a time constant of T3, a second filter having first order lag characteristics with a time constant of T4, a subtracter which performs subtraction between a signal outputted from the first filter and a signal outputted from the second filter and outputs a resulting difference, and an amplifier for multiplying an output of the subtracter by the gain G, and outputting a resulting product, and the gain G is set at an arbitrary value, and the setting number α is set using Formula (04):

[2nd mathematical formula]

$$\alpha = \frac{-(T2-T1) \pm \sqrt{(T2-T1)^2 + 4G^2 \cdot T1 \cdot T2}}{2T1 \cdot G} \quad (04)$$

Another constitution of the present invention is the above system stabilization device, wherein in each of the first to fourth fluctuation detection blocks, the cut-off frequency on the high frequency side of the pass band frequency of the fluctuation detection block is set as f1, the cut-off frequency on the low frequency side of the pass band frequency is set as f2, the time constant for noise removal with a value of 1/f1 is set as T1, the time constant for setting the fluctuation detection time with a value of 1/f2 is set as T2, the oscillation coefficient is set as ζ, the setting number is set as α, the gain is set as G, the value obtained by multiplying T1 by α is set as T3, and the value obtained by dividing T2 by α is set as T4, the first to fourth fluctuation detection blocks each perform computations with use of computing programs to carry out first order lag filtering of the input signal inputted to the fluctuation detection block, with a time constant as T3, to determine a first filter signal, carry out first order lag filtering of the input signal inputted to the fluctuation detection block, with a time constant as T4, to determine a second filter signal, subtract the second filter signal from the first filter signal to determine a subtraction signal, and multiply the subtraction signal by the gain G to determine a fluctuation component, and output the fluctuation component as the current command.

Another constitution of the present invention is a system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detection block, and uses the fluctuation component as a current command for the active component;

determines a fluctuation component included in the reactive component of the system current by a second fluctuation detection block, and uses the fluctuation component as a current command for the reactive component;

further determines an active component of an alternating current output current and a reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detection block, and uses the fluctuation component as a current command for an active component;

determines a fluctuation component included in the amplitude signal by a fourth fluctuation detection block, and uses the fluctuation component as a current command for a reactive component;

further determines the active component of the alternating current output current and the reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when a cut-off frequency on a high frequency side of a pass band frequency of the fluctuation detection block is set to be f1, a time constant of a low-pass filter for noise removal which has a cut-off frequency of f1 is set to be T1, ζ is set as an oscillation coefficient, α is set as a setting number, G is set as a gain, a value obtained by multiplying T1 by α is set to be T3, a cushioning time set at an arbitrary time is set to be T5, one sampling period is set to be Ts, and X is set as a limiting value, the first to fourth fluctuation detection blocks each have a filter having first order lag characteristics with a time constant of T3, a limiter having limiting characteristics defined as ±(X/T5) Ts, a delay circuit for delaying an inputted signal by one sampling period Ts and outputting the delayed signal, a first subtracter, a second subtracter, an adder, and an amplifier, the first subtracter performs subtraction between a signal outputted from the filter having the first order lag characteristics and a signal outputted from the delay circuit, and feeds a resulting difference to the limiter, the adder adds a signal outputted from the limiter and the signal outputted from the delay circuit, and outputs a resulting sum, the delay circuit delays the signal outputted from the adder by one sampling period Ts, and outputs the delayed signal, the second subtracter performs subtraction between the signal outputted from the filter having the first order lag characteristics and the signal outputted from the adder, and outputs a resulting difference to the amplifier, the amplifier multiplies the output of the adder by the gain G, and outputs a resulting product, and ζ expressed by Formula (01) is set at a value of 1 or higher, and the setting number α and the gain G are set using the Formula (01), Formula (02) and Formula (03):

[3rd mathematical formulas]

$$\zeta = \frac{T1 \cdot \alpha + \frac{T2}{\alpha}}{2\sqrt{T1T2}} \quad (01)$$

$$\alpha = \frac{2\sqrt{T1T2} \cdot \xi \pm \sqrt{4T1 \cdot T2 \cdot \xi^2 - 4T1 \cdot T2}}{2T1} \quad (02)$$

$$G = \frac{\alpha(T2 - T1)}{T2 - \alpha^2 T1} \quad (03)$$

Another constitution of the present invention is a system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detection block, and uses the fluctuation component as a current command for the active component;

determines a fluctuation component included in the reactive component of the system current by a second fluctuation detection block, and uses the fluctuation component as a current command for the reactive component;

further determines an active component of an alternating current output current and a reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detection block, and uses the fluctuation component as a current command for an active component;

determines a fluctuation component included in the amplitude signal by a fourth fluctuation detection block, and uses the fluctuation component as a current command for a reactive component;

further determines the active component of the alternating current output current and the reactive component of the alternating current output current, the alternating current output current being outputted from the power converter; and outputs the gate signal for reducing a current deviation for the active component, which is a deviation between the current command for the active component and the active component of the alternating current output current, to zero, and also reducing a current deviation for the reactive component, which is a deviation between the current command for the reactive component and the reactive component of the alternating current output current, to zero, and when a cut-off frequency on a high frequency side of a pass band frequency of the fluctuation detection block is set to be f1, a time constant of a low-pass filter for noise removal which has a cut-off frequency of f1 is set to be T1, ζ is set as an oscillation coefficient, α is set as a setting number, G is set as again, a value obtained by multiplying T1 by α is set to be T3, a cushioning time set at an arbitrary time is set to be T5, one sampling period is set to be Ts, and X is set as a limiting value, the first to fourth fluctuation detection blocks each have a filter having first order lag characteristics with a time constant of T3, a limiter having limiting characteristics defined as ±(X/T5) Ts, a delay circuit for delaying an inputted signal by one sampling period Ts and outputting the delayed signal, a first subtracter, a second subtracter, an adder, and an amplifier, the first subtracter performs subtraction between a signal outputted from the filter having the first order lag characteristics and a signal outputted from the delay circuit, and feeds a resulting difference to the limiter, the adder adds a signal outputted from the limiter and the signal outputted from the delay circuit, and outputs a resulting sum, the delay circuit delays the signal outputted from the adder by one sampling period Ts, and outputs the delayed signal, the second subtracter performs subtraction between the signal outputted from the filter having the first order lag characteristics and the signal outputted from the adder, and outputs a resulting difference to the amplifier, the amplifier multiplies the output of the adder by the gain G, and outputs a resulting product, and the gain G is set at an arbitrary value, and the setting number α is set using Formula (04):

[4th mathematical formula]

$$\alpha = \frac{-(T2 - T1) \pm \sqrt{(T2 - T1)^2 + 4G^2 \cdot T1 \cdot T2}}{2T1 \cdot G} \quad (04)$$

Another constitution of the present invention is the above system stabilization device, wherein in each of the first to fourth fluctuation detection blocks, the cut-off frequency on the high frequency side of the pass band frequency of the fluctuation detection block is set as f1, the time constant for noise removal with a value of 1/f1 is set as T1, the oscillation coefficient is set as ζ, the setting number is set as α, the gain is set as G, the value obtained by multiplying T1 by α is set as T3, the cushioning time set at the arbitrary time is set as T5, the one sampling period is set as Ts, and the limiting value is set as X, the first to fourth fluctuation detection blocks each perform computations with use of computing programs to carry out first order lag filtering of the input signal inputted to the fluctuation detection block, with a time constant as T3, to determine a filter signal, subtract the delayed signal from the filter signal to determine a first subtraction signal, perform a limiting operation on the first subtraction signal by the limiting characteristics defined as ±(X/T5)Ts to determine a limit signal, add the limit signal and the delayed signal to determine an addition signal, delay the addition signal by the one sampling period Ts to form the delayed signal, subtract the addition signal from the filter signal to determine a second subtraction signal, and multiply the second subtraction signal by the gain G to obtain a fluctuation component, and output the fluctuation component as the current command.

Effects of the Invention

According to the present invention, the system stabilization device outputs compensating power. In this connection, when the detected value of the system current or the detected value of the system voltage is about to decrease, feedback control or signal amplification is performed within the fluctuation detection block.

Generally, a filter circuit (composed of a reactor, a capacitor and a transformer) is added to the alternating current output side of a power converter (inverter) in order to smooth a pulse voltage outputted from the inverter.

With the present invention, feedback control is exercised or signal amplification is performed within the fluctuation detection block, whereby the above decrease is compensated for. Thus, there is no need to use a PI amplifier, or the current detector AA for detecting the current fed out from the system stabilization device to the distribution system, namely, the output current outputted from the power converter, filtered by the filter circuit, and then sent out to the distribution system. Nevertheless, stable control actions by the system stabilization device can be ensured.

MODE FOR CARRYING OUT THE INVENTION

A mode for carrying out the present invention will be described in detail based on embodiments of the invention.

Embodiment 1

Figure 1:
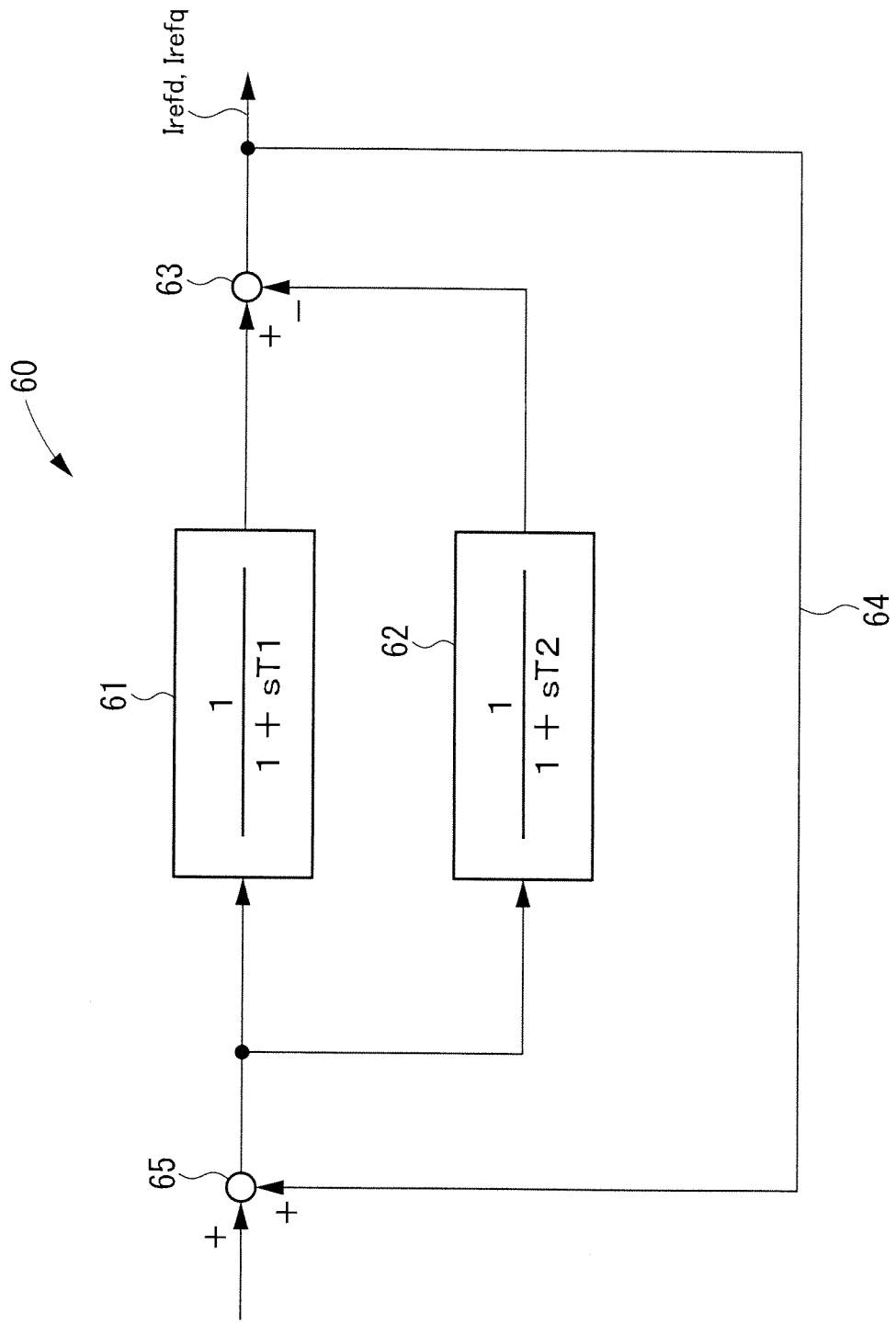
[FIG. 1] is a circuit diagram showing a fluctuation detection block according to Embodiment 1 of the present invention.
Figure 8:
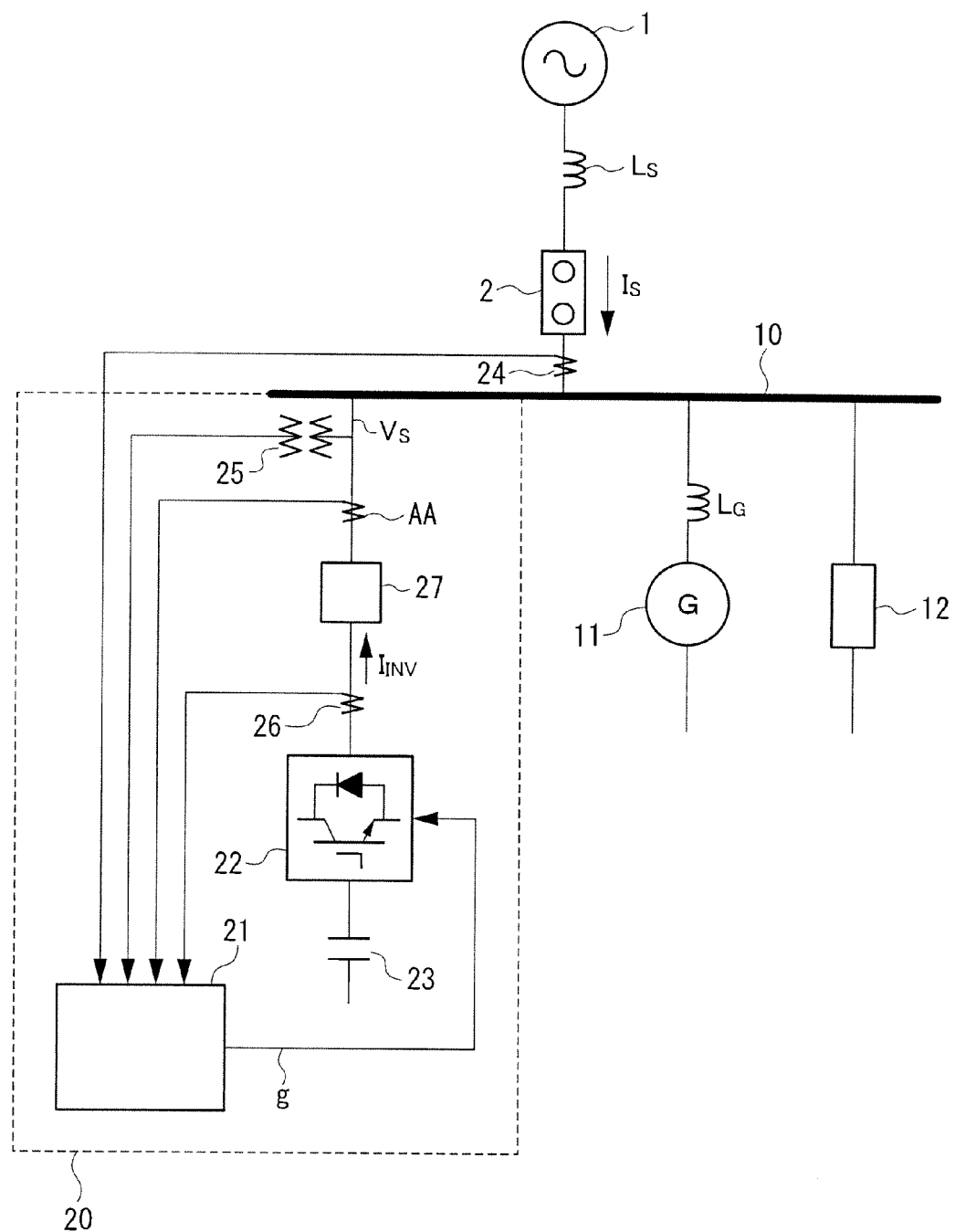
[FIG. 8] is a circuit configuration diagram showing the micro grid equipped with a system stabilization device.
Figure 9:
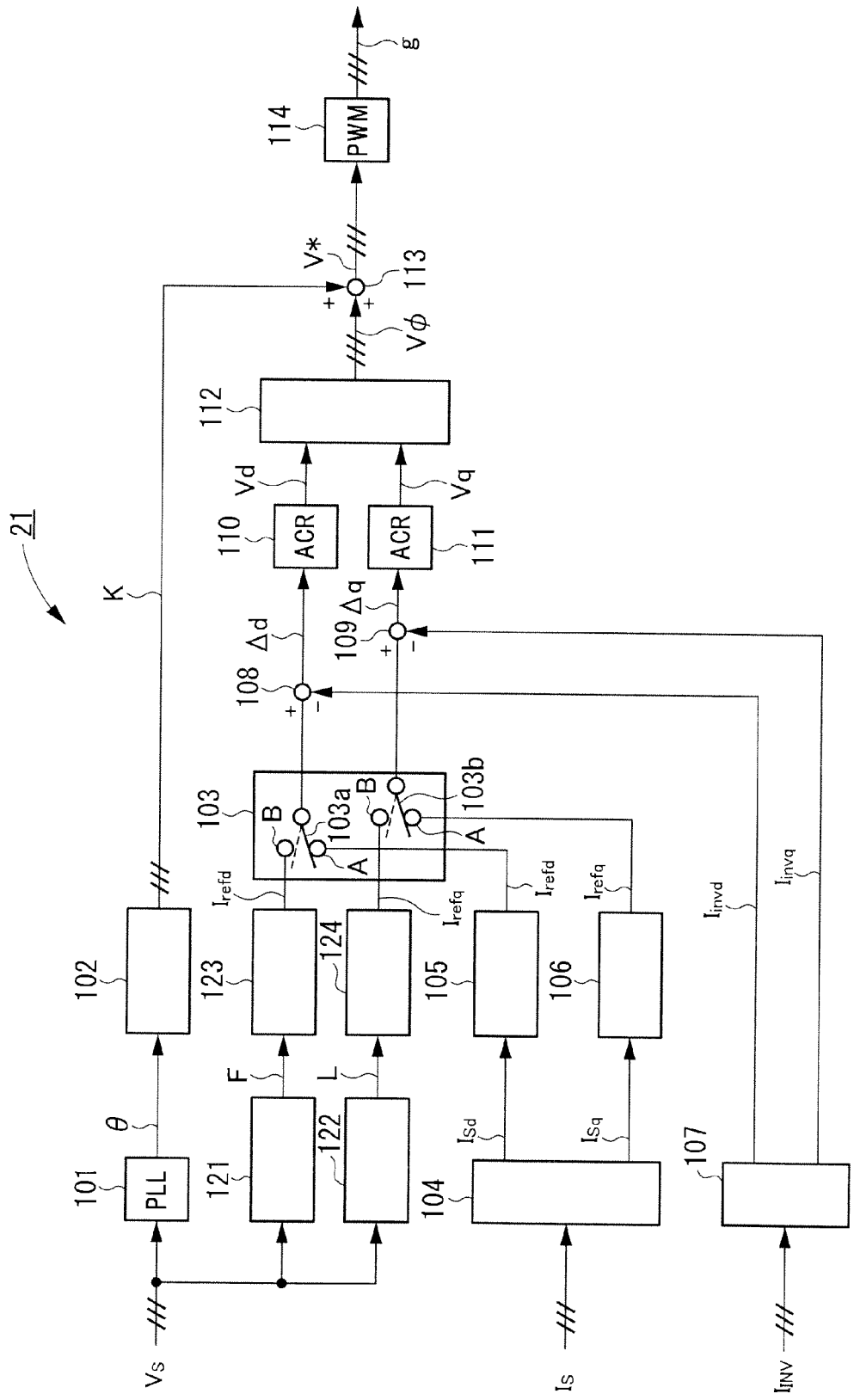
[FIG. 9] is a circuit diagram showing a control unit of the system stabilization device.
Figure 10:
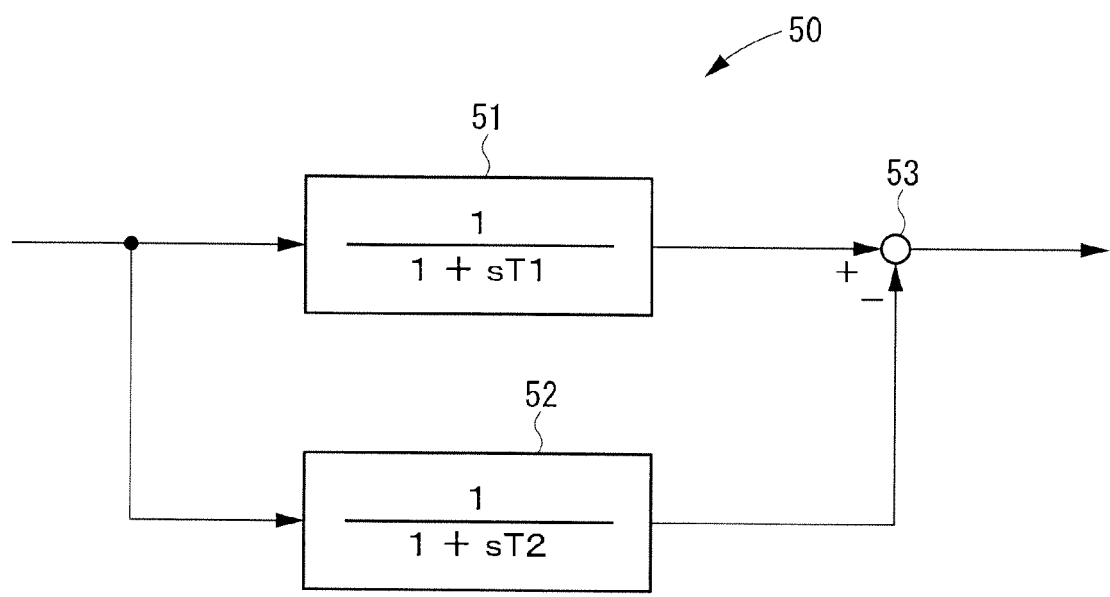
[FIG. 10] is a circuit diagram showing a conventional fluctuation detection block.

FIG. 1 shows a fluctuation detection block 60 according to Embodiment 1 of the present invention. The fluctuation detection block 60 is applied to the fluctuation detection blocks 105, 106, 123, 124 (see FIG. 9) incorporated into the control unit 21 of the system stabilization device 20 (see FIG. 8).

As shown in FIG. 1, the fluctuation detection block 60 is composed of a filter 61, a filter 62, a subtracter 63, a feedback circuit 64, and an adder 65.

The pass band frequency of the fluctuation detection block 60 is determined by filtering characteristics required of the respective fluctuation detection blocks 105, 106, 123, 124.

The cut-off frequency on the high frequency side of the determined pass band frequency is set to be f1, and the cut-off frequency on the low frequency side of the determined pass band frequency is set to be f2. Thus, the low-pass filter 61 for noise removal has a cut-off frequency set at f1, and has a time constant set at T1. The low-pass filter 62 for setting the fluctuation detection time has a cut-off frequency set at f2, and has a time constant set at T2. Here, f1=1/T1, and f2=1/T2.

The low-pass filter 61 is a filter having first order lag characteristics, and its time constant is set to be the time constant T1 determined for the purpose of noise removal.

The low-pass filter 62 is a filter having first order lag characteristics, and its time constant is set to be the time constant T2 determined for the purpose of setting the time for detecting fluctuations.

When receiving an input signal and a feedback signal fed back through the feedback circuit 64, both filters 61 and 62 utilize their filtering characteristics to filter the input signal and the feedback signal.

If the fluctuation detection block 60 is the fluctuation detection block 105, its input signal is the active component $Is_d$ of the system current.

If the fluctuation detection block 60 is the fluctuation detection block 106, its input signal is the reactive component $Is_q$ of the system current.

If the fluctuation detection block 60 is the fluctuation detection block 123, its input signal is the frequency signal F.

If the fluctuation detection block 60 is the fluctuation detection block 124, its input signal is the amplitude signal L.

The subtracter 63 outputs a signal obtained by subtracting a signal outputted from the low-pass filter 62 from a signal outputted from the low-pass filter 61.

The signal outputted from the subtracter 63 is fed back through the feedback circuit 64, and added to the input signal by the adder 65, whereafter the sum is inputted to the low-pass filters 61, 62.

Eventually, the subtracter 63 outputs a fluctuation component signal included in the input signal to which the feedback signal has been added.

If the fluctuation detection block 60 is the fluctuation detection block 105, its fluctuation component signal is the current command $I_{refd}$ for the active component which is the fluctuation component of the active component $Is_d$ of the system current.

If the fluctuation detection block 60 is the fluctuation detection block 106, its fluctuation component signal is the current command $I_{refq}$ for the reactive component which is the fluctuation component of the reactive component $Is_q$ of the system current.

If the fluctuation detection block 60 is the fluctuation detection block 123, its fluctuation component signal is the current command $I_{refd}$ for the active component which is the fluctuation component of the frequency signal F.

If the fluctuation detection block 60 is the fluctuation detection block 124, its fluctuation component signal is the current command $I_{refq}$ for the reactive component which is the fluctuation component of the amplitude signal L.

In Embodiment 1, the feedback signal fed back by the feedback circuit 64 corresponds to the AC output current $I_{inv}$. Thus, the addition of the feedback signal to the input signal is equivalent to the addition of the AC output current $I_{inv}$ to the input signal.

As described above, the system stabilization device 20 (power converter 22) makes power compensation. Even if the detected value of the system current Is during the system-interconnected run, or the detected value of the system voltage Vs during the self-supporting run decreases, therefore, the feedback signal corresponding to the AC output current $I_{inv}$ is added to the input signal in the present embodiment. Consequently, the above decrease is complemented by the feedback signal.

As a result, even in the presence of a decrease in the detected value of the system current Is or the detected value of the system voltage Vs, the control actions of the system stabilization device 20 are stable.

In addition, there is no need to use a PI amplifier, or the current detector AA for detecting the current fed out from the system stabilization device 20 to the distribution system, namely, the output current outputted from the power converter 22, filtered by the filter circuit 27, and then sent out to the distribution system 10.

The transfer function of the fluctuation detection block 60 of Embodiment 1 shown in FIG. 1 is represented by Expression (1) indicated below. Expression (2) is a general expression for a lag element.

[5th mathematical formulas]

$$\frac{s(T2-T1)}{(1+sT1)(1+sT2)-s(T2-T1)} = s \cdot \frac{T2-T1}{T1T1} \cdot \frac{1}{s^2 + \frac{2T1}{T1T2}s + \frac{1}{T1T1}} \quad (1)$$

$$\frac{1}{s^2 + 2\omega_0\xi + \omega_0^2} \quad (2)$$

As seen from the Expression (1), the transfer function of the fluctuation detection block 60 can be resolved into a derivative element, a gain element, and a lag element. A comparison of the coefficients of the lag element in the Expression (1) and the lag element in the Expression (2) shows an oscillation coefficient $\zeta = (T1/T2)^{1/2}$ Since the time constant T1 is a time constant for noise removal, it has a very small value. The time constant T2, on the other hand, is a time constant for setting the time for detecting fluctuations, so that it is normally set at a larger value than that of the time constant T1. Thus, T2>>T1 holds.

Since T2>>T1, the oscillation coefficient $\zeta$ is smaller than 1, as indicated by Formula (3), meaning that the characteristics are oscillatory.

[6th mathematical formula]

$$\zeta = \sqrt{\frac{T1}{T2}} \ll 1 \quad (3)$$

Embodiment 1 can also be realized by performing computations using computing programs (software) preset in a computer.

That is, with the embodiment utilizing software, the fluctuation detection block 60 can be constructed as computing programs (software) incorporated into (set in) a computer as hardware, the computing programs for performing necessary computations as the fluctuation detection block 60.

With the fluctuation detection block 60 according to the embodiment utilizing software, the following arithmetic operations or computations are performed by computing programs:

(1) In accordance with the computing programs, the cut-off frequency on the high frequency side of the pass band frequency of the fluctuation detection block 60 is set as f1, the cut-off frequency on the low frequency side of the pass band frequency is set as f2, the time constant for noise removal with a value of 1/f1 is set as T1, and the time constant for setting the fluctuation detection time with a value of 1/f2 is set as T2.

(2) After completion of the above settings, the fluctuation detection block 60 performs computations with the use of the computing programs to (2-1) add the input signal inputted to the fluctuation detection block 60 and the feedback signal, (2-2) carry out the first order lag filtering of the sum of the input signal and the feedback signal, with the time constant as T1, to determine a first filter signal, (2-3) carry out the first order lag filtering of the sum of the input signal and the feedback signal, with the time constant as T2, to determine a second filter signal, (2-4) subtract the second filter signal from the first filter signal to determine a fluctuation component, output the fluctuation component as the current commands $I_{refd}$, $I_{refq}$ and feed back the fluctuation component as the feedback signal.

In the above-mentioned manner, the active current command $I_{refd}$ and the reactive current command $I_{refq}$, obtained by the computations using the computing programs, can be outputted.

Embodiment 2

Figure 2:
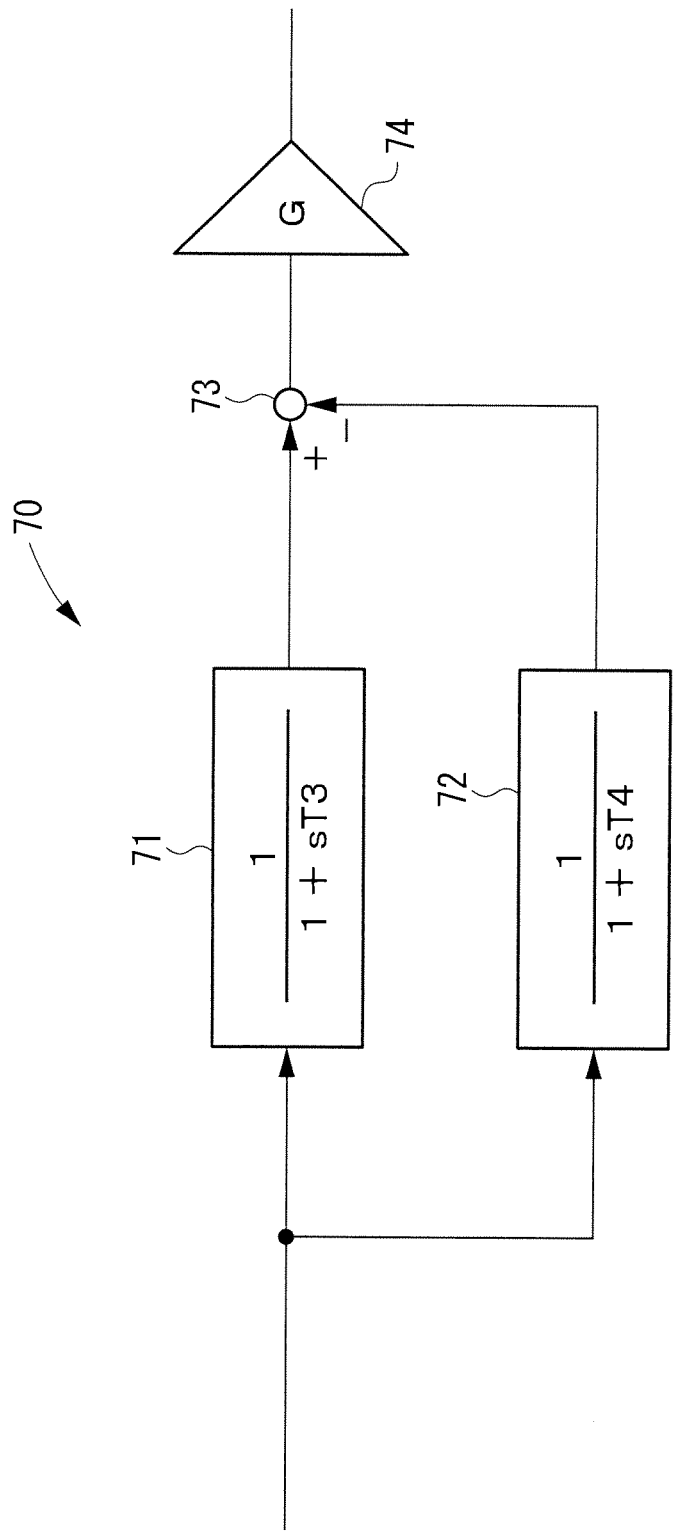
[FIG. 2] is a circuit diagram showing a fluctuation detection block according to Embodiment 2 of the present invention.

FIG. 2 shows a fluctuation detection block 70 according to Embodiment 2 of the present invention. The fluctuation detection block 70 is applied to the fluctuation detection blocks 105, 106, 123, 124 (see FIG. 9) incorporated into the control unit 21 of the system stabilization device 20 (see FIG. 8).

The fluctuation detection block 70 of Embodiment 2 is an improvement on the fluctuation detection block 60 of Embodiment 1, and represents a solution to the problem of Embodiment 1, namely, the problem that the characteristics are oscillatory.

As shown in FIG. 2, the fluctuation detection block 70 is composed of a low-pass filter 71, a low-pass filter 72, a subtracter 73, and an amplifier 74.

The pass band frequency of the fluctuation detection block 70 is determined by filtering characteristics required of the respective fluctuation detection blocks 105, 106, 123, 124.

The cut-off frequency on the high frequency side of the determined pass band frequency is set to be f1, and the cut-off frequency on the low frequency side of the determined pass band frequency is set to be f2. Thus, the low-pass filter 71 for noise removal has a cut-off frequency set at f1, and has a time constant set at T1. The low-pass filter 72 for setting the fluctuation detection time has a cut-off frequency set at f2, and has a time constant set at T2. Here, f1=1/T1, and f2=1/T2.

Further, a setting number a is α value represented by Formula (6) to be described later, and the following parameters are set based thereon:

$$T3 = T1 \times \alpha, \quad T4 = T2/\alpha$$

The low-pass filter 71 is a filter having first order lag characteristics, and its time constant is set to be the time constant T3. This time constant T3 is a value obtained by multiplying the time constant T1, which has been determined for the purpose of noise removal, by the setting number α.

The low-pass filter 72 is a filter having first order lag characteristics, and its time constant is set to be the time constant T4. This time constant T4 is a value obtained by dividing the time constant T2, which has been determined for the purpose of setting the time for detecting fluctuations, by the setting number α.

When receiving an input signal, both filters 71 and 72 utilize their filtering characteristics to filter the input signal.

If the fluctuation detection block 70 is the fluctuation detection block 105, its input signal is the active component $Is_d$ of the system current.

If the fluctuation detection block 70 is the fluctuation detection block 106, its input signal is the reactive component $Is_q$ of the system current.

If the fluctuation detection block 70 is the fluctuation detection block 123, its input signal is the frequency signal F.

If the fluctuation detection block 70 is the fluctuation detection block 124, its input signal is the amplitude signal L.

The subtracter 73 outputs a signal obtained by subtracting a signal outputted from the low-pass filter 72 from a signal outputted from the low-pass filter 71.

The subtracter 73 outputs a fluctuation component signal included in the input signal.

If the fluctuation detection block 70 is the fluctuation detection block 105, its fluctuation component signal is the current command $I_{refd}$ for the active component which is the fluctuation component of the active component $Is_d$ of the system current.

If the fluctuation detection block 70 is the fluctuation detection block 106, its fluctuation component signal is the current command $I_{refq}$ for the reactive component which is the fluctuation component of the reactive component $Is_q$ of the system current.

If the fluctuation detection block 70 is the fluctuation detection block 123, its fluctuation component signal is the current command $I_{refd}$ for the active component which is the fluctuation component of the frequency signal F.

If the fluctuation detection block 70 is the fluctuation detection block 124, its fluctuation component signal is the current command $I_{refq}$ for the reactive component which is the fluctuation component of the amplitude signal L.

The fluctuation component signal outputted from the subtracter 73 is amplified by the amplifier 74.

The gain G of this amplifier 74 is a value expressed by Formula (7) to be described later.

In Embodiment 2, the fluctuation component signal is amplified by the amplifier 74, and the amplified signal is outputted as the current command $I_{refd}$ for the active component or the current command $I_{refq}$ for the reactive component.

As described above, the system stabilization device 20 (power converter 22) makes power compensation. Even if the detected value of the system current Is during the system-interconnected run, or the detected value of the system voltage Vs during the self-supporting run decreases, therefore, the above decrease is complemented by amplification by the amplifier 74. This is because the signal obtained by amplifying the fluctuation component signal by the amplifier 74 is outputted as the current command $I_{refd}$ for the active component or the current command $I_{refq}$ for the reactive component.

As a result, even in the presence of a decrease in the detected value of the system current Is or the detected value of the system voltage Vs, the control actions of the system stabilization device 20 are stable.

In addition, there is no need to use a PI amplifier, or the current detector AA for detecting the current fed out from the system stabilization device 20 to the distribution system, namely, the output current outputted from the power converter 22, filtered by the filter circuit 27, and then sent out to the distribution system 10.

The characteristics of the fluctuation detection block 70 will now be explained.

The transfer function of the fluctuation detection block 70 is represented by Expression (4) indicated below.

[7th mathematical formula]

$$G \cdot \frac{s\left(\frac{T2}{\alpha} - T1 \cdot \alpha\right)}{(1 + sT1 \cdot \alpha)\left(1 + s\frac{T2}{\alpha}\right)} = s \cdot \frac{G\left[\frac{T2}{\alpha} - T1 \cdot \alpha\right]}{T1T1} \cdot \frac{1}{s^2 + \frac{T1 \cdot \alpha + \frac{T2}{\alpha}}{T1T2}s + \frac{1}{T1T2}} \quad (4)$$

The oscillation coefficient ζ of the lag element in the Expression (4) is expressed by Formula (5) indicated below. If this parameter is designed as ζ≧1 in the Formula (5), the characteristics of the fluctuation detection block 70 are not oscillatory.

[8th mathematical formula]

$$\zeta = \frac{T1 \cdot \alpha + \frac{T2}{\alpha}}{2\sqrt{T1T2}} \quad (5)$$

By modifying the Formula (5), the setting number a can be expressed by Formula (6) presented below.

The gain G can be expressed by Formula (7) by comparing the term of the gain in the Expression (1) with the term of the gain in the Expression (4).

[9th mathematical formulas]

$$\alpha = \frac{2\sqrt{T1T2} \cdot \xi \pm \sqrt{4T1 \cdot T2 \cdot \xi^2 - 4T1 \cdot T2}}{2T1} \quad (6)$$

$$G = \frac{\alpha(T2 - T1)}{T2 - \alpha^2 T1} \quad (7)$$

A method for designing the respective filters 71 and 72 of the fluctuation detection block 70 is to set ζ indicated by the Formula (5) as ζ≧1, and then determine the setting number α and the gain G by use of the Formulas (6) and (7).

By so doing, ζ can be set as ζ>1, exhibiting the feature that the characteristics of the fluctuation detection block 70 are not oscillatory.

Embodiment 3

In Embodiment 3, the configuration of the fluctuation detection block 70 is itself the same as that in Embodiment 2, but the procedure of the method for designing the respective filters 71 and 72 of the fluctuation detection block 70 is different.

In the designing method of Embodiment 3, the gain G is determined first, and then the setting number α is determined. By so doing, it becomes possible to carry out a design placing priority on the term of the gain G, rather than a design using the oscillation coefficient ζ as an indicator.

Concretely, upon comparison between the coefficients of the term of the gain shown by the Expression (1) and the term of the gain shown by the Expression (4), the setting number α after setting of the gain G is expressed by the following Formula (8).

[10th mathematical formula]

$$\alpha = \frac{-(T2-T1) \pm \sqrt{(T2-T1)^2 + 4G^2 \cdot T1 \cdot T2}}{2T1 \cdot G} \quad (8)$$

The oscillation coefficient ζ is the same as that in the Formula (5) shown in Embodiment 2.

Embodiments 2 and 3 can also be realized by performing computations using computing programs (software) preset in a computer.

That is, with the embodiments utilizing software, the fluctuation detection block 70 can be constructed as computing programs (software) incorporated into (set in a computer as hardware, the computing programs for performing necessary computations for the fluctuation detection block 70.

With the fluctuation detection block 70 according to the embodiments utilizing software, the following arithmetic operations or computations are performed by computing programs:

(1) In accordance with the computing programs, the cut-off frequency on the high frequency side of the pass band frequency of the fluctuation detection block 70 is set as f1; the cut-off frequency on the low frequency side of the pass band frequency is set as f2; the time constant for noise removal with a value of 1/f1 is set as T1; the time constant for setting the fluctuation detection time with a value of 1/f2 is set as T2; the oscillation coefficient is set as ζ; the setting number is set as α; the gain is set as G; the value obtained by multiplying T1 by α is set as T3; and the value obtained by dividing T2 by α is set as T4.

(2) After completion of the above settings, the fluctuation detection block 70 performs computations with the use of the computing programs to (2-1) carry out the first order lag filtering of the input signal inputted to the fluctuation detection block 70, with the time constant as T3, to determine a first filter signal, (2-2) carry out the first order lag filtering of the input signal inputted to the fluctuation detection block 70, with the time constant as T4, to determine a second filter signal, (2-3) subtract the second filter signal from the first filter signal to determine a subtraction signal, and (2-4) multiply the subtraction signal by the gain G to obtain a fluctuation component, and output this fluctuation component as the current commands $I_{refd}$, $I_{refq}$.

In the above-mentioned manner, the active current command $I_{refd}$ and the reactive current command $I_{refq}$ obtained by the computations using the computing programs, can be outputted.

Embodiment 4

Figure 3:
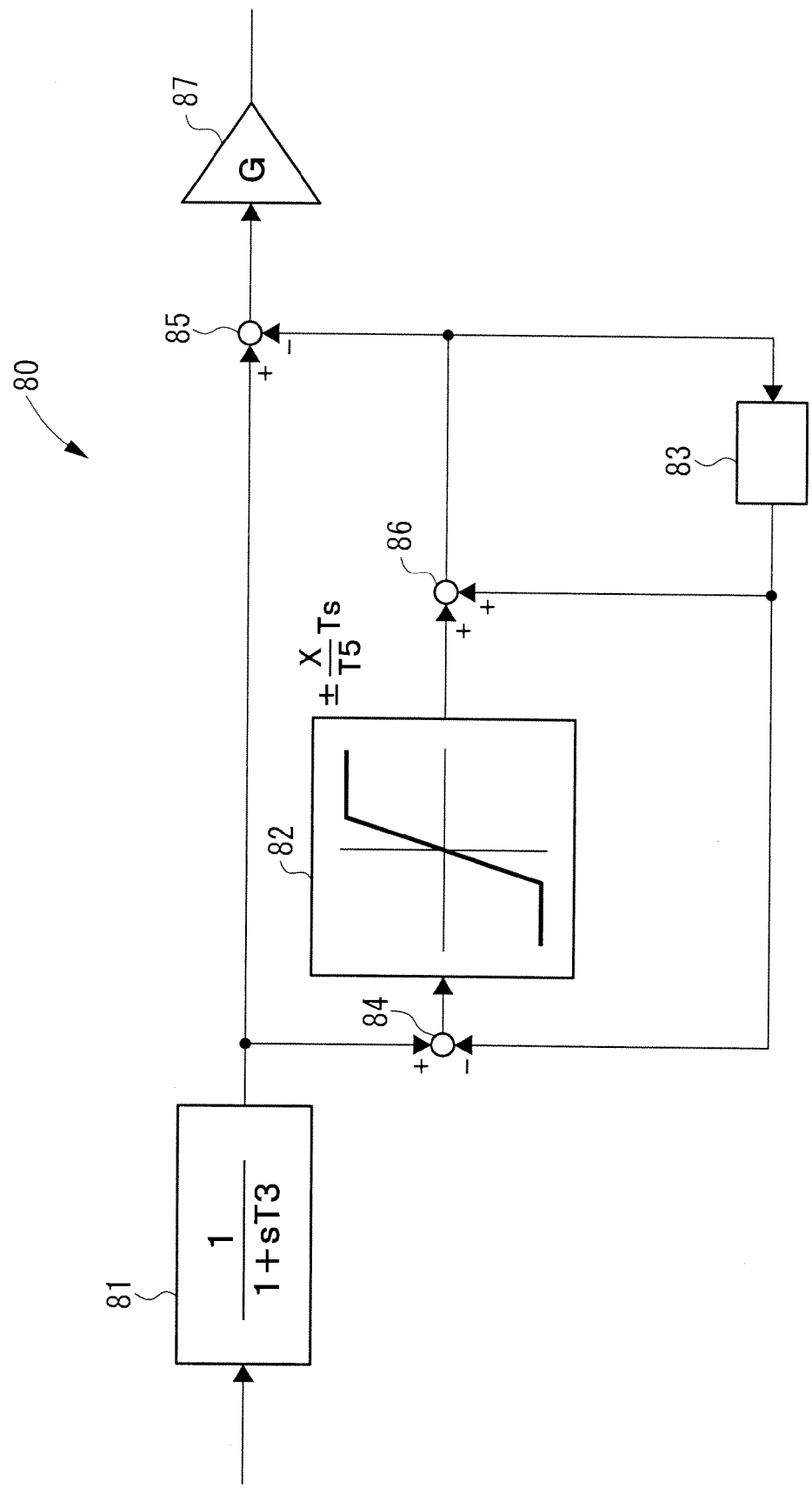
[FIG. 3] is a circuit diagram showing a fluctuation detection block according to Embodiment 4 of the present invention.

FIG. 3 shows a fluctuation detection block 80 according to Embodiment 4 of the present invention. The fluctuation detection block 80 is applied to the fluctuation detection blocks 105, 106, 123, 124 (see FIG. 9) incorporated into the control unit 21 of the system stabilization device 20 (see FIG. 8).

As shown in FIG. 3, the fluctuation detection block 80 is composed of a low-pass filter 81, a limiter 82, a delay circuit 83, a first subtracter 84, a second subtracter 85, an adder 86, and an amplifier 87.

The pass band frequency of the fluctuation detection block 80 is determined by filtering characteristics required of the respective fluctuation detection blocks 105, 106, 123, 124. The cut-off frequency on the high frequency side of the determined pass band frequency is set to be f1. The time constant of the low-pass filter 81 for noise removal, which has the cut-off frequency set at f1, is set to be T1. Here, f1=1/T1.

Further, a setting number α is a value expressed by the aforementioned Formula (6), and the following parameter is set based thereon:

$$T3 = T1 \times \alpha$$

The low-pass filter 81 is a filter having first order lag characteristics, and its time constant is set to be T3. This time constant T3 is a value obtained by multiplying the time constant T1, which has been determined for the purpose of noise removal, by the setting number α.

When receiving an input signal, the low-pass filter 81 utilizes its filtering characteristics to filter the input signal.

If the fluctuation detection block 80 is the fluctuation detection block 105, its input signal is the active component $Is_d$ of the system current.

If the fluctuation detection block 80 is the fluctuation detection block 106, its input signal is the reactive component $Is_q$ of the system current.

If the fluctuation detection block 80 is the fluctuation detection block 123, its input signal is the frequency signal F.

If the fluctuation detection block 80 is the fluctuation detection block 124, its input signal is the amplitude signal L.

The limiter 82 has limiting characteristics defined as ±(X/T5)Ts.

T5 represents a cushioning time set at an arbitrary duration, Ts represents one sampling period, and X represents a limiting value.

This limiter 82 limits the amount of change for one sampling period Ts. When the signal value of the signal inputted to the limiter 82 is a value between +X (upper limiting value) and −X (lower limiting value), the limiter 82 holds the signal value of the signal as such, and outputs it. When the signal value of the signal inputted to the limiter 82 is above +X (upper limiting value), the limiter 82 allows the value to increase with a constant gradient for a predetermined time, and then limits the value to +X. When the signal value of the signal inputted to the limiter 82 is below −X (lower limiting value), the limiter 82 allows the value to decrease with a constant gradient for a predetermined time, and then limits the value to −X.

The delay circuit 83 has the properties of delaying the inputted signal by one sampling period Ts and outputting the delayed signal. This delay circuit 83 can be constructed, for example, by a Z transformation circuit having such properties as to show $Z^{-1}$.

The subtracter 84 subtracts the signal, which has been outputted from the delay circuit 83, from the signal outputted from the filter 81 having the first order lag characteristics, and sends a signal corresponding to the difference to the limiter 82.

That is, the output signal of the delay circuit 83 is provided as negative feedback at the stage preceding the limiter 82.

The adder 86 adds the signal outputted from the limiter 82 and the signal outputted from the delay circuit 83, and outputs the sum.

That is, the output signal of the delay circuit 83 is provided as positive feedback at the stage succeeding the limiter 82.

The delay circuit 83 delays the signal outputted from the adder by one sampling period Ts, and outputs the delayed signal.

As described above, the signal outputted from the delay circuit 83 is provided as negative feedback at the stage preceding the limiter 82, and is provided as positive feedback at the stage succeeding the limiter 83. Thus, the signal status is as follows:

The output of the subtracter 84 is "the present sampled value−the value after limiter processing performed one sampling period previously". Thus, if the signal value inputted from the filter 81 to the subtracter 84 is +X or less, or −X or more, the signal value outputted from the limiter 82 is 0. If the signal value inputted from the filter 81 to the subtracter 84 is above +X, but below −X, the signal value outputted from the limiter 82 is a value beyond the limiting value (+X, −X).

The output of the adder 86 is "the output of the limiter+the value after limiter processing performed one sampling period previously".

The subtracter 85 subtracts the signal, which has been outputted from the adder 86, from the signal outputted from the low-pass filter 81 having the first order lag characteristics, and outputs the difference. A fluctuation component signal included in the input signal is outputted from the subtracter 85.

If the fluctuation detection block 80 is the fluctuation detection block 105, its fluctuation component signal is the current command $I_{refd}$ for the active component which is the fluctuation component of the active component $Is_d$ of the system current.

If the fluctuation detection block 80 is the fluctuation detection block 106, its fluctuation component signal is the current command $I_{refq}$ for the reactive component which is the fluctuation component of the reactive component $Is_q$ of the system current.

If the fluctuation detection block 80 is the fluctuation detection block 123, its fluctuation component signal is the current command $I_{refd}$ for the active component which is the fluctuation component of the frequency signal F.

If the fluctuation detection block 80 is the fluctuation detection block 124, its fluctuation component signal is the current command $I_{refq}$ for the reactive component which is the fluctuation component of the amplitude signal L.

The fluctuation component signal outputted from the subtracter 85 is amplified by the amplifier 87.

The gain G of this amplifier 87 is the value expressed by the aforementioned Formula (7).

In Embodiment 4, the fluctuation component signal is amplified by the amplifier 87, and the amplified signal is outputted as the current command $I_{refd}$ for the active component or the current command $I_{refq}$ for the reactive component.

As described above, the system stabilization device 20 (power converter 22) makes power compensation. Even if the detected value of the system current Is during the system-interconnected run, or the detected value of the system voltage Vs during the self-supporting run decreases, therefore, the above decrease is complemented by amplification by the amplifier 87. This is because the signal obtained by amplifying the fluctuation component signal by the amplifier 87 is outputted as the current command $I_{refd}$ for the active component or the current command $I_{refq}$ for the reactive component.

As a result, even in the presence of a decrease in the detected value of the system current Is or the detected value of the system voltage Vs, the control actions of the system stabilization device 20 are stable.

In addition, there is no need to use a PI amplifier, or the current detector AA for detecting the current fed out from the system stabilization device 20 to the distribution system, namely, the output current outputted from the power converter 22, filtered by the filter circuit 27, and then sent out to the distribution system 10.

A method for designing the filter 81 of the fluctuation detection block 80 is to set $\zeta$ indicated by the Formula (5) as $\zeta \geq 1$, and then determine the setting number α and the gain G by use of the Formulas (6) and (7).

By so doing, $\zeta$ can be set as $\zeta > 1$, exhibiting the feature that the characteristics of the fluctuation detection block 80 are not oscillatory.

The signal characteristics of the fluctuation detection block 80 shown in FIG. 3 and the fluctuation detection block 70 shown in FIG. 2 will be explained by reference to FIGS. 4(a) to 4(e).

Figure 4A:
[FIGS. 4(a) to 4(e)] are waveform charts for comparing the characteristics of Embodiment 2 and Embodiment 4.

For example, a case where a stepped signal as shown in FIG. 4(a) is inputted to the fluctuation detection blocks 70, 80 is explained.

Figure 4B:
Figure 4C:

In this case, with the fluctuation detection block 70 shown in FIG. 2, the output waveform of the low-pass filter 72 is as in FIG. 4(b), and the output waveform of the amplifier 74 is as in FIG. 4(c).

Figure 4D:
Figure 4E:

With the fluctuation detection block 80 shown in FIG. 3, the output waveform of the adder 86 is as in FIG. 4(d), and the output waveform of the amplifier 87 is as in FIG. 4(d).

As seen above, a comparison of FIGS. 4(b) to 4(e) shows that nearly comparable actions are performed.

Next, computational loads on the fluctuation detection block 80 shown in FIG. 3 and the fluctuation detection block 70 shown in FIG. 2 will be described by reference to FIGS. 5 and 6.

Figure 5:
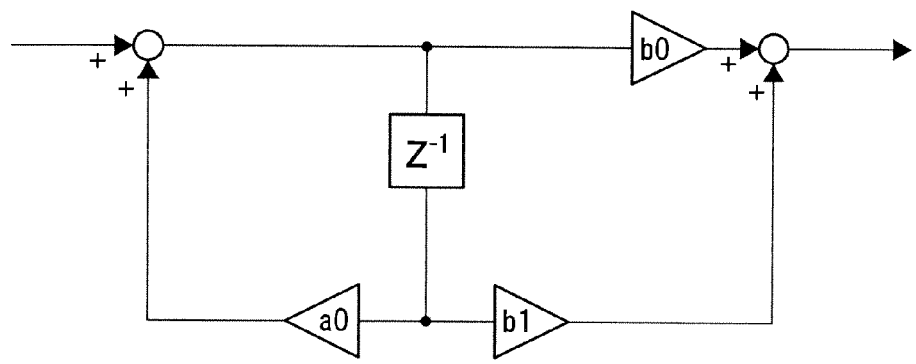
[FIG. 5] is a circuit diagram showing an example in which a filter of Embodiment 2 is composed of an IIR filter.

The low-pass filter 72 of the fluctuation detection block 70 shown in FIG. 2, if realized using an IIR (infinite impulse response) filter, will be as shown in FIG. 5. As seen from FIG. 5, the low-pass filter 72, if realized with the IIR filter, requires computations including three multiplications, two additions, and one delay.

Figure 6:
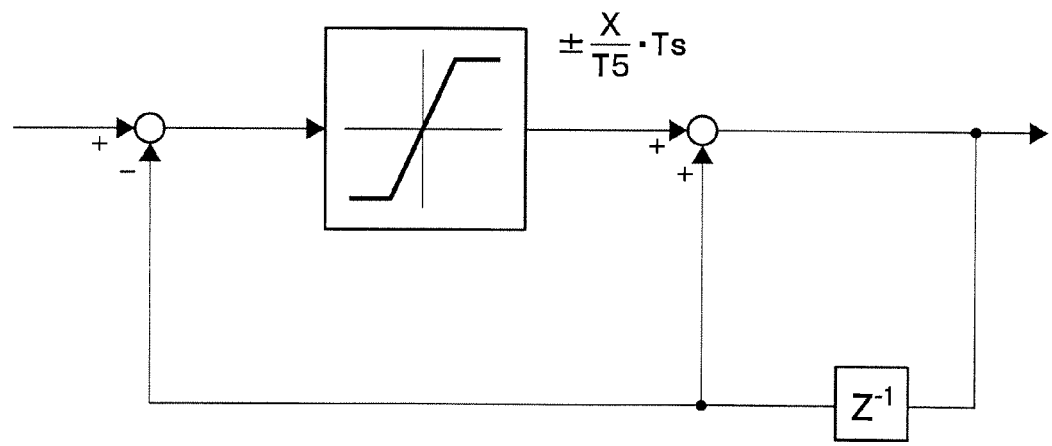
[FIG. 6] is a circuit diagram showing an example in which a cushioning unit of Embodiment 4 is composed of an IIR filter.
Figure 7:
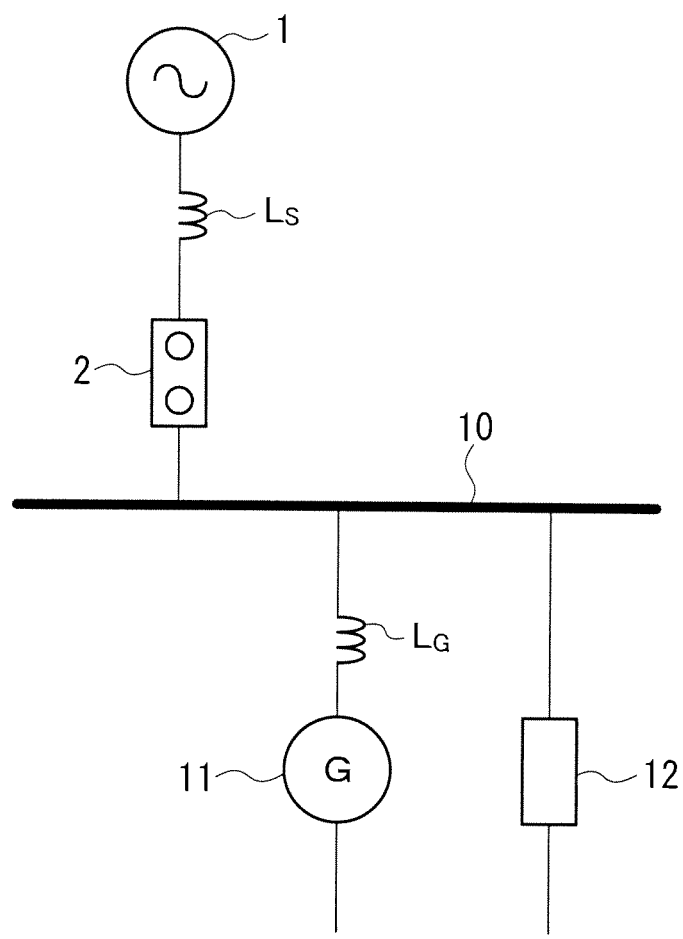
[FIG. 7] is a circuit configuration diagram showing a micro grid.

Of the fluctuation detection block 80 shown in FIG. 3, on the other hand, the unit composed of the limiter 82, the delay circuit 83, the subtracter 84, and the adder 85 (namely, the cushioning unit), if realized using an IIR filter, will be as shown in FIG. 6. As seen from FIG. 6, the cushioning unit, if realized with the IIR filter, requires computations including no multiplications, two additions, and one delay.

In view of these features, the computational load on the fluctuation detection block 80 shown in FIG. 3 is light compared with the computational load on the fluctuation detection block 70 shown in FIG. 2.

Embodiment 5

In Embodiment 5, the configuration of the fluctuation detection block 80 is itself the same as that in Embodiment 4, but the procedure of the method for designing the filter 81 of the fluctuation detection block 80 is different.

In the designing method of Embodiment 5, the gain G is determined first, and then the setting number α is determined.

By so doing, it becomes possible to carry out a design placing priority on the term of the gain G, rather than a design using the oscillation coefficient ζ as an indicator.

Concretely, upon comparison between the coefficients of the term of the gain shown by the Expression (1) and the term of the gain shown by the Expression (4), the setting number α after setting of the gain G is expressed by the aforementioned Formula (8).

The oscillation coefficient ζ is the same as that in the aforementioned Formula (5).

Embodiments 4 and 5 can also be realized by performing computations using computing programs (software) preset in a computer.

That is, with the embodiments utilizing software, the fluctuation detection block 80 can be constructed as computing programs (software) incorporated into (set in) a computer as hardware, the computing programs for performing necessary computations for the fluctuation detection block 80.

With the fluctuation detection block 80 according to the embodiments utilizing software, the following arithmetic operations or computations are performed by computing programs:

(1) In accordance with the computing programs, the cut-off frequency on the high frequency side of the pass band frequency of the fluctuation detection block 80 is set as f1; the time constant for noise removal with a value of 1/f1 is set as T1; the oscillation coefficient is set as ζ; the setting number is set as α; the gain is set as G; the value obtained by multiplying T1 by α is set as T3; the cushioning time set at an arbitrary duration is set as T5, one sampling period is set as Ts, and the limiting value is set as X.

(2) After completion of the above settings, the fluctuation detection block 80 performs computations with the use of the computing programs to (2-1) carry out the first order lag filtering of the input signal inputted to the fluctuation detection block 80, with the time constant as T3, to determine a filter signal, (2-2) subtract the delayed signal from the filter signal to determine a first subtraction signal, (2-3) perform a limiting operation on the first subtraction signal by limiting characteristics defined as ±(X/T5) Ts to determine a limit signal, (2-4) add the limit signal and the delayed signal to determine an addition signal, (2-5) delay the addition signal by one sampling period Ts to form the above delayed signal, (2-6) subtract the addition signal from the filter signal to determine a second subtraction signal, and (2-7) multiply the second subtraction signal by the gain G to obtain a fluctuation component, and output this fluctuation component as the current commands $I_{refd}$, $I_{refq}$.

In the above-mentioned manner, the active current command $I_{refd}$ and the reactive current command $I_{refq}$, obtained by the computations using the computing programs, can be outputted.

DESCRIPTION OF THE NUMERALS

1 Power system, 2 Circuit breaker, 10 Distribution system, 11 Dispersed generation plant, 12 Load, 20 System stabilization device, 21 Control unit, 22 Power converter, 23 Direct current charging unit, 24, 26 Current detector, 25 Voltage detector, 60, 70, 80 Fluctuation detection block, 105, 106, 123, 124 Fluctuation detection block.

The invention claimed is:

1. A system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines a first active component of a system current and a first reactive component of the system current, the system current flowing from the power system into the distribution system;

determines a first fluctuation component included in the first active component of the system current by a first fluctuation detection block, and uses the first fluctuation component as a first current command for the first active component;

determines a second fluctuation component included in the first reactive component of the system current by a second fluctuation detection block, and uses the second fluctuation component as a second current command for the first reactive component;

further determines a second active component of an alternating current output current and a second reactive component of the alternating current output current, the alternating current output current being outputted from the power converter; and outputs the gate signal for reducing a first current deviation, which is a first deviation between the first current command for the first active component and the second active component of the alternating current output current, to zero, and also reducing a second current deviation, which is a second deviation between the second current command for the first reactive component and the second reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a third fluctuation component included in the frequency signal by a third fluctuation detection block, and uses the third fluctuation component as a third current command for a third active component;

determines a fourth fluctuation component included in the amplitude signal by a fourth fluctuation detection block, and uses the fourth fluctuation component as a fourth current command for a third reactive component;

further determines the second active component of the alternating current output current and the second reactive component of the alternating current output current, the alternating current output current being outputted from the power converter; and outputs the gate signal for reducing a third current deviation, which is a third deviation between the third current command for the third active component and the second active component of the alternating current output current, to zero, and also reducing a fourth current deviation, which is a fourth deviation between the fourth current command for the third reactive component and the second reactive component of the alternating current output current, to zero, and when a first cut-off frequency on a high frequency side of a pass band frequency of a fluctuation detection block is set to be f1, a second cut-off frequency on a low frequency side of the pass band frequency is set to be f2, a first time constant of a first low-pass filter for noise removal which has the first cut-off frequency of f1 is set to be T1, and a second time constant of a second low-pass filter for setting a fluctuation detection time which has the second cut-off frequency of f2 is set to be T2, the first fluctuation detection block, the second fluctuation detection block, the third fluctuation detection block, and the fourth fluctuation detection block are each composed of a first filter having first order lag characteristics with the first time constant of T1, a second filter having first order lag characteristics with the second time constant of T2, a subtracter which performs subtraction between a first signal outputted from the first filter and a second signal outputted from the second filter and outputs a resulting difference, and a feedback circuit for providing the first filter and the second filter with feedback on an output of the subtracter.

2. The system stabilization device according to claim 1, wherein in each of the first fluctuation detection block, the second fluctuation detection block, the third fluctuation detection block, and the fourth fluctuation detection block, the first cut-off frequency on the high frequency side of the pass band frequency of the fluctuation detection block is set as f1, the second cut-off frequency on the low frequency side of the pass band frequency is set as f2, the first time constant for noise removal with a value of 1/f1 is set as T1, and the second time constant for setting the fluctuation detection time with a value of 1/f2 is set as T2, and the first fluctuation detection block, the second fluctuation detection block, the third fluctuation detection block and the fourth fluctuation detection block each perform computations with use of computing programs to add an input signal inputted to the fluctuation detection block and a feedback signal, carry out first order lag filtering of a sum of the input signal and the feedback signal, with the time constant as T1, to determine the first filter signal, carry out first order lag filtering of a sum of the input signal and the feedback signal, with the time constant as T2, to determine the second filter signal, and subtract the second filter signal from the first filter signal to determine a fluctuation component, output the fluctuation component as the first current command the second current command the third current command, and the fourth current command, and feed back the fluctuation component as the feedback signal.

3. A system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines a first active component of a system current and a first reactive component of the system current, the system current flowing from the power system into the distribution system;

determines a first fluctuation component included in the first active component of the system current by a first fluctuation detection block, and uses the first fluctuation component as a first current command for the first active component;

determines a second fluctuation component included in the first reactive component of the system current by a second fluctuation detection block, and uses the second fluctuation component as a second current command for the first reactive component;

further determines a second active component of an alternating current output current and a second reactive component of the alternating current output current, the alternating current output current being outputted from the power converter; and outputs the gate signal for reducing a first current deviation, which is a first deviation between the first current command for the first active component and the second active component of the alternating current output current, to zero, and also reducing a second current deviation, which is a second deviation between the second current command for the first reactive component and the second reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a third fluctuation component included in the frequency signal by a third fluctuation detection block, and uses the third fluctuation component as a third current command for a third active component;

determines a fourth fluctuation component included in the amplitude signal by a fourth fluctuation detection block, and uses the fourth fluctuation component as a fourth current command for a third reactive component;

further determines the second active component of the alternating current output current and the second reactive component of the alternating current output current, the alternating current output current being outputted from the power converter; and outputs the gate signal for reducing a third current deviation, which is a third deviation between the third current command for the third active component and the second active component of the alternating current output current, to zero, and also reducing a fourth current deviation, which is a fourth deviation between the fourth current command for the third reactive component and the second reactive component of the alternating current output current, to zero, and when a first cut-off frequency on a high frequency side of a pass band frequency of a fluctuation detection block is set to be f1, a second cut-off frequency on a low frequency side of the pass band frequency is set to be f2, a first time constant of a first low-pass filter for noise removal which has the first cut-off frequency of f1 is set to be T1, a second time constant of a second low-pass filter for setting a fluctuation detection time which has the second cut-off frequency of f2 is set to be T2, $\zeta$ set as an oscillation coefficient, $\alpha$ is set as a setting number, G is set as a gain, a value obtained by multiplying T1 by $\alpha$ is set to be T3, and a value obtained by dividing T2 by $\alpha$ is set to be T4, the first fluctuation detection block, the second fluctuation detection block, the third fluctuation detection block, and the fourth fluctuation detection block are each composed of a first filter having first order lag characteristics with a time constant of T3, a second filter having first order lag characteristics with a time constant of T4, a subtracter which performs subtraction between a signal outputted from the first filter and a signal outputted from the second filter and outputs a resulting difference, and an amplifier for multiplying an output of the subtracter by the gain G, and outputting a resulting product, and $\zeta$ expressed by a Formula (01) is set at a value of 1 or higher, and the setting number $\alpha$ and the gain G are set using the Formula (01), a Formula (02) and a Formula (03):

$$\zeta = \frac{T1 \cdot \alpha + \frac{T2}{\alpha}}{2\sqrt{T1T2}} \quad (01)$$

$$\alpha = \frac{2\sqrt{T1T2} \cdot \xi \pm \sqrt{4T1 \cdot T2 \cdot \xi^2 - 4T1 \cdot T2}}{2T1} \quad (02)$$

$$G = \frac{\alpha(T2 - T1)}{T2 - \alpha^2 T1}. \quad (03)$$

4. A system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines a first active component of a system current and a first reactive component of the system current, the system current flowing from the power system into the distribution system;

determines a first fluctuation component included in the first active component of the system current by a first fluctuation detection block, and uses the first fluctuation component as a first current command for the first active component;

determines a second fluctuation component included in the first reactive component of the system current by a second fluctuation detection block, and uses the second fluctuation component as a second current command for the first reactive component;

further determines a second active component of an alternating current output current and a second reactive component of the alternating current output current, the alternating current output current being outputted from the power converter; and outputs the gate signal for reducing a first current deviation, which is a first deviation between the first current command for the first active component and the second active component of the alternating current output current, to zero, and also reducing a second current deviation, which is a second deviation between the second current command for the first reactive component and the second reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a third fluctuation component included in the frequency signal by a third fluctuation detection block, and uses the third fluctuation component as a third current command for a third active component;

determines a fourth fluctuation component included in the amplitude signal by a fourth fluctuation detection block, and uses the fourth fluctuation component as a fourth current command for a third reactive component;

further determines the second active component of the alternating current output current and the second reactive component of the alternating current output current, the alternating current output current being outputted from the power converter; and outputs the gate signal for reducing a third current deviation, which is a third deviation between the third current command for the third active component and the second active component of the alternating current output current, to zero, and also reducing a fourth current deviation, which is a fourth deviation between the fourth current command for the third reactive component and the second reactive component of the alternating current output current, to zero, and when a first cut-off frequency on a high frequency side of a pass band frequency of a fluctuation detection block is set to be f1, a second cut-off frequency on a low frequency side of the pass band frequency is set to be f2, a first time constant of a first low-pass filter for noise removal which has the first cut-off frequency of f1 is set to be T1, a second time constant of a second low-pass filter for setting a fluctuation detection time which has the second cut-off frequency of f2 is set to be T2, $\zeta$ is set as an oscillation coefficient, $\alpha$ is set as a setting number, G is set as a gain, a value obtained by multiplying T1 by $\alpha$ is set to be T3, and a value obtained by dividing T2 by $\alpha$ a is set to be T4, the first fluctuation detection block, the second fluctuation detection block, the third fluctuation detection block, and the fourth fluctuation detection block are each composed of a first filter having first order lag characteristics with a third time constant of T3, a second filter having first order lag characteristics with a fourth time constant of T4, a subtracter which performs subtraction between a signal outputted from the first filter and a signal outputted from the second filter and outputs a resulting difference, and an amplifier for multiplying an output of the subtracter by the gain G, and outputting a resulting product, and the gain G is set at an arbitrary value, and the setting number $\alpha$ is set using a Formula (04):

$$\alpha = \frac{-(T2 - T1) \pm \sqrt{(T2 - T1)^2 + 4G^2 \cdot T1 \cdot T2}}{2T1 \cdot G}. \quad (04)$$

5. The system stabilization device according to claim 3, wherein in each of the first fluctuation detection block, the second fluctuation detection block, the third fluctuation detection block, and the fourth fluctuation detection block, the first cut-off frequency on the high frequency side of the pass band frequency of a fluctuation detection block is set as f1, the second cut-off frequency on the low frequency side of the pass band frequency is set as f2, the first time constant for noise removal with a value of 1/f1 is set as T1, the second time constant for setting the fluctuation detection time with a value of 1/f2 is set as T2, the oscillation coefficient is set as $\zeta$, the setting number is set as α, the gain is set as G, the value obtained by multiplying T1 by α is set as T3, and the value obtained by dividing T2 by α is set as T4, the first fluctuation detection block, the second fluctuation detection block, the third fluctuation detection block, and the fourth fluctuation detection block each perform computations with use of computing programs to carry out first order lag filtering of an input signal inputted to the fluctuation detection block, with the third time constant as T3, to determine a first filter signal, carry out first order lag filtering of the input signal inputted to the fluctuation detection block, with the fourth time constant as T4, to determine a second filter signal, subtract the second filter signal from the first filter signal to determine a subtraction signal, and multiply the subtraction signal by the gain G to determine a fluctuation component, and output the fluctuation component as the first current command, the second current command, the third current command, and the fourth current command.

6. A system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines a first active component of a system current and a first reactive component of the system current, the system current flowing from the power system into the distribution system;

determines a first fluctuation component included in the first active component of the system current by a first fluctuation detection block, and uses the first fluctuation component as a first current command for the first active component;

determines a second fluctuation component included in the first reactive component of the system current by a second fluctuation detection block, and uses the second fluctuation component as a second current command for the first reactive component;

further determines a second active component of an alternating current output current and a second reactive component of the alternating current output current, the alternating current output current being outputted from the power converter; and outputs the gate signal for reducing a first current deviation, which is a first deviation between the first current command for the first active component and the second active component of the alternating current output current, to zero, and also reducing a second current deviation, which is a second deviation between the second current command for the first reactive component and the second reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a third fluctuation component included in the frequency signal by a third fluctuation detection block, and uses the third fluctuation component as a third current command for a third active component;

determines a fourth fluctuation component included in the amplitude signal by a fourth fluctuation detection block, and uses the fourth fluctuation component as a fourth current command for a third reactive component;

further determines the second active component of the alternating current output current and the second reactive component of the alternating current output current, the alternating current output current being outputted from the power converter; and outputs the gate signal for reducing a third current deviation, which is a third deviation between the third current command for the third active component and the second active component of the alternating current output current, to zero, and also reducing a fourth current deviation, which is a fourth deviation between the fourth current command for the third reactive component and the second reactive component of the alternating current output current, to zero, and when a first cut-off frequency on a high frequency side of a pass band frequency of a fluctuation detection block, is set to be f1, a first time constant of a low-pass filter for noise removal which has a first cut-off frequency of f1 is set to be T1, ζ is set as an oscillation coefficient, α is set as a setting number, G is set as a gain, a value obtained by multiplying T1 by α is set to be T3, a cushioning time set at an arbitrary time is set to be T5, one sampling period is set to be Ts, and x is set as a limiting value, the first fluctuation detection block, the second fluctuation detection block, the third fluctuation detection block, and the fourth fluctuation detection block each have a filter having first order lag characteristics with a third time constant of T3, a limiter having limiting characteristics defined as ±(x/T5)Ts, a delay circuit for delaying an inputted signal by one sampling period Ts and outputting a delayed signal, a first subtracter, a second subtracter, an adder, and an amplifier, the first subtracter performs subtraction between a signal outputted from the filter having the first order lag characteristics and a signal outputted from the delay circuit, and feeds a resulting difference to the limiter, the adder adds a signal outputted from the limiter and the signal outputted from the delay circuit, and outputs a resulting sum, the delay circuit delays the signal outputted from the adder by one sampling period Ts, and outputs the delayed signal, the second subtracter performs subtraction between the signal outputted from the filter having the first order lag characteristics and the signal outputted from the adder, and outputs a resulting difference to the amplifier, the amplifier multiplies the output of the adder by the gain G, and outputs a resulting product, and ζ expressed by a Formula (01) is set at a value of 1 or higher, and the setting number α and the gain G are set using the Formula (01), a Formula (02) and a Formula (03):

$$\zeta = \frac{T1 \cdot \alpha + \frac{T2}{\alpha}}{2\sqrt{T1 T2}} \quad (01)$$

$$\alpha = \frac{2\sqrt{T1 T2} \cdot \xi \pm \sqrt{4T1 \cdot T2 \cdot \xi^2 - 4T1 \cdot T2}}{2T1} \quad (02)$$

-continued $$G = \frac{\alpha(T2-T1)}{T2-\alpha^2 T1}. \quad (03)$$

7. A system stabilization device provided in a distribution system which, when a power system is normal, is connected to the power system, and when an abnormality occurs in the power system, is cut off from the power system, and to which a dispersed generation plant and a load are connected, the system stabilization device having a control unit, and a power converter which performs a converting action and an inverting action in accordance with a gate signal fed from the control unit, wherein when the power system is normal, the control unit determines a first active component of a system current and a first reactive component of the system current, the system current flowing from the power system into the distribution system;

determines a first fluctuation component included in the first active component of the system current by a first fluctuation detection block, and uses the first fluctuation component as a first current command for the first active component;

determines a second fluctuation component included in the first reactive component of the system current by a second fluctuation detection block, and uses the second fluctuation component as a second current command for the first reactive component;

further determines a second active component of an alternating current output current and a second reactive component of the alternating current output current, the alternating current output current being outputted from the power converter; and outputs the gate signal for reducing a first current deviation, which is a first deviation, which is a first deviation between the first current command for the first active component and the second active component of the alternating current output current, to zero, and also reducing a second current deviation, which is a deviation between the second current command for the first reactive component and the second reactive component of the alternating current output current, to zero, and when the abnormality occurs in the power system, the control unit determines, from a system voltage of the distribution system, a frequency signal showing a frequency of the system voltage and an amplitude signal showing an amplitude of the system voltage;

determines a third fluctuation component included in the frequency signal by a third fluctuation detection block, and uses the third fluctuation component as a third current command for a third active component;

determines a fourth fluctuation component included in the amplitude signal by a fourth fluctuation detection block, and uses the fourth fluctuation component as a fourth current command for a third reactive component;

further determines the second active component of the alternating current output current and the second reactive component of the alternating current output current, the alternating current output current being outputted from the power converter; and outputs the gate signal for reducing a third current deviation, which is a third deviation between the third current command for the third active component and the second active component of the alternating current output current, to zero, and also reducing a fourth current deviation, which is a fourth deviation between the fourth current command for the third reactive component and the second reactive component of the alternating current output current, to zero, and when a first cut-off frequency on a high frequency side of a pass band frequency of a fluctuation detection block is set to be f1, a first time constant of a low-pass filter for noise removal which has a first cut-off frequency of f1 is set to be T1, $\zeta$ is set as an oscillation coefficient, $\alpha$ is set as a setting number, G is set as a gain, a value obtained by multiplying T1 by $\alpha$ is set to be T3, a cushioning time set at an arbitrary time is set to be T5, one sampling period is set to be Ts, and x is set as a limiting value, the first fluctuation detection block, the second fluctuation detection block, the third fluctuation detection block, and the fourth fluctuation detection block each have a filter having first order lag characteristics with a third time constant of T3, a limiter having limiting characteristics defined as $\pm(x/T5)Ts$, a delay circuit for delaying an inputted signal by one sampling period Ts and outputting a delayed signal, a first subtracter, a second subtracter, an adder, and an amplifier, the first subtracter performs subtraction between a signal outputted from the filter having the first order lag characteristics and a signal outputted from the delay circuit, and feeds a resulting difference to the limiter, the adder adds a signal outputted from the limiter and the signal outputted from the delay circuit, and outputs a resulting sum, the delay circuit delays the signal outputted from the adder by one sampling period Ts, and outputs the delayed signal, the second subtracter performs subtraction between the signal outputted from the filter having the first order lag characteristics and the signal outputted from the adder, and outputs a resulting difference to the amplifier, the amplifier multiplies the output of the adder by the gain G, and outputs a resulting product, and the gain G is set at an arbitrary value, and the setting number $\alpha$ is set using a Formula (04):

$$\alpha = \frac{-(T2-T1) \pm \sqrt{(T2-T1)^2 + 4G^2 \cdot T1 \cdot T2}}{2T1 \cdot G}. \quad (04)$$

8. The system stabilization device according to claim 6, wherein in each of the first fluctuation detection block, the second fluctuation detection block, the third fluctuation detection block, and the fourth fluctuation detection block, the first cut-off frequency on the high frequency side of the pass band frequency of a fluctuation detection block is set as f1, the first time constant for noise removal with a value of 1/f1 is set as T1, the oscillation coefficient is set as $\zeta$ the setting number is set as $\alpha$, the gain is set as G, the value obtained by multiplying T1 by $\alpha$ is set as T3, the cushioning time set at the arbitrary time is set as T5, the one sampling period is set as Ts, and the limiting value is set as x, the first fluctuation detection block, the second fluctuation detection block, the third fluctuation detection block, and the fourth fluctuation detection block each perform computations with use of computing programs to carry out first order lag filtering of an input signal inputted to the fluctuation detection block, with a third time constant as T3, to determine a filter signal, subtract the delayed signal from the filter signal to determine a first subtraction signal,
perform a limiting operation on the first subtraction signal by the limiting characteristics defined as $\pm(x/T5)Ts$ to determine a limit signal,
add the limit signal and the delayed signal to determine an addition signal,
delay the addition signal by the one sampling period Ts to form the delayed signal,
subtract the addition signal from the filter signal to determine a second subtraction signal, and multiply the second subtraction signal by the gain G to obtain a fluctuation component, and output the fluctuation component as the first current command, the second current command, the third current command, and the fourth current command.

* * * * *